United States Patent
Noguchi et al.

(10) Patent No.: US 6,794,005 B2
(45) Date of Patent: Sep. 21, 2004

(54) OPTICAL RECORDING MEDIUM, OPTICAL RECORDING METHOD AND OPTICAL RECORDING DEVICE

(75) Inventors: Soh Noguchi, Yokohama (JP); Tsutomu Satoh, Yokohama (JP); Tatsuya Tomura, Tokyo (JP); Yasunobu Ueno, Kanagawa-ken (JP); Tohru Yashiro, Ebina (JP); Tomomi Ishimi, Yokohama (JP); Ikuo Shimizu, Yokkaichi (JP); Motoharu Kinugasa, Yokkaichi (JP); Hiroshi Toyoda, Yokkaichi (JP); Shiho Yamada, Yokkaichi (JP)

(73) Assignees: Ricoh Company, Ltd., Tokyo (JP); Kyowa Hakko Kogyo Co., Ltd., Tokyo (JP); Kyowa Yuka Co., Ltd., Tokyo (JP)

(*) Notice: Subject to any disclaimer, the term of this patent is extended or adjusted under 35 U.S.C. 154(b) by 4 days.

(21) Appl. No.: 10/357,813

(22) Filed: Feb. 4, 2003

(65) Prior Publication Data

US 2003/0206514 A1 Nov. 6, 2003

(30) Foreign Application Priority Data

Feb. 12, 2002 (JP) .......................................... 2002-34725
May 22, 2002 (JP) .......................................... 2002-148122
May 17, 2002 (JP) .......................................... 2002-142718
May 17, 2002 (JP) .......................................... 2002-143691

(51) Int. Cl.[7] ................................................ B32B 3/02

(52) U.S. Cl. ................. 428/64.1; 428/64.8; 430/270.16

(58) Field of Search ........................... 428/64.1, 64.8, 428/913; 430/270.14, 270.16, 495.1, 945

(56) References Cited

U.S. PATENT DOCUMENTS 5,190,849 A   3/1993   Santoh et al. ............... 430/495
5,532,033 A   7/1996   Yashiro ...................... 428/64.1

(List continued on next page.)

FOREIGN PATENT DOCUMENTS

| EP | 0750020 | 12/1996 |
| EP | 0837459 | 4/1998 |
| EP | 1041549 | 10/2000 |
| EP | 1103547 | 5/2001 |
| EP | 1267338 | 12/2002 |

OTHER PUBLICATIONS

U.S. patent application Ser. No. 10/166,742, filed Jun. 11, 2002.

(List continued on next page.)

Primary Examiner—Elizabeth Mulvaney
(74) Attorney, Agent, or Firm—Cooper & Dunham LLP

(57) ABSTRACT

An optical recording medium having a substrate, and a recording layer provided on the substrate and containing: (a) a formazan metal chelate including a formazan compound and a metal component, (b) a squarylium metal chelate including a squarylium compound and a metal component; and (c) at least one additional dye selected from phthalocyanine compounds and pentamethine cyanine compounds. Alternatively, the recording layer contains (a) a first formazan metal chelate including a first formazan compound and a first metal component and having the maximum absorption wavelength in the range of 500 to 650 nm, (b) a squarylium metal chelate including a squarylium compound and a metal component; and (c) a second formazan metal chelate including a second formazan compound and a second metal component and having the maximum absorption wavelength different from that of the first formazan metal chelate and in the range of 650 to 750 nm.

33 Claims, 3 Drawing Sheets

Recording/Reading Wavelength

U.S. PATENT DOCUMENTS

| | | | |
|---|---|---|---|
| 5,580,696 A | 12/1996 | Yashiro | 430/270.17 |
| 5,695,843 A | 12/1997 | Chapman et al. | 428/64.1 |
| 5,863,703 A | 1/1999 | Tomura et al. | 430/270.16 |
| 5,882,757 A | 3/1999 | Yashiro | 428/64.1 |
| 5,932,721 A | 8/1999 | Yashiro et al. | 540/139 |
| 5,939,163 A | 8/1999 | Ueno et al. | 428/64.1 |
| 5,968,708 A | 10/1999 | Yashiro et al. | 430/270.1 |
| 5,998,093 A | 12/1999 | Tomura et al. | 430/270.16 |
| 6,043,355 A | 3/2000 | Yashiro et al. | 540/139 |
| 6,045,971 A | 4/2000 | Yashiro | 430/270.16 |
| 6,057,020 A | 5/2000 | Ueno et al. | 428/64.1 |
| 6,137,769 A | 10/2000 | Sawada et al. | 369/275.3 |
| 6,197,477 B1 | 3/2001 | Satoh et al. | 430/270.16 |
| 6,225,022 B1 | 5/2001 | Tomura et al. | 430/270.16 |
| 6,383,596 B1 * | 5/2002 | Arioka et al. | 428/64.1 |
| 6,469,963 B1 | 10/2002 | Sawada et al. | 369/47.1 |
| 6,645,594 B1 * | 11/2003 | Yano et al. | 428/64.1 |

OTHER PUBLICATIONS

U.S. patent application Ser. No. 10/100,198, filed Mar. 18, 2002.

U.S. patent application Ser. No. 09/925,425, filed Aug. 9, 2001.

U.S. patent application Ser. No. 09/913,504, filed Dec. 15, 2000.

U.S. patent application Ser. No. 09/798,565, filed Mar. 2, 2001.

U.S. patent application Ser. No. 09/609,419, filed Jul. 5, 2000.

U.S. patent application Ser. No. 09/722,689, filed Nov. 28, 2000.

U.S. patent application Ser. No. 09/709,811, filed Nov. 10, 2000.

* cited by examiner

OPTICAL RECORDING MEDIUM, OPTICAL RECORDING METHOD AND OPTICAL RECORDING DEVICE

BACKGROUND OF THE INVENTION

The present invention relates to an optical recording medium, an optical recording method and an optical recording device.

As next-generation high-capacity optical disc systems, DVD-R and DVD+R are under development. In order to increase the recording capacity of DVD-R and DVD+R, it is necessary to develop recording materials that can reduce the size of a recording pit, to use image compression technique such as MPEG2 (motion picture experts group) and to develop semiconductor laser capable of emitting light having a short wavelength suitable for reading small recorded pits.

As for the laser diodes emitting light in the red region, AlGaInP semiconductor laser, which emits light having a wavelength of 670 nm, has been developed for commercial operation in bar code readers and measuring instruments. With an increase of the capacity of optical discs, red color semiconductor laser has been used in the optical data storage field. In the case of DVD drives, the standardized light source is light within the 630–690 nm band emitted by semiconductor laser. As for the read-only DVD-ROM (digital versatile disc-read-only-memory), driving systems using light having a wavelength of about 650 nm are marketed.

In the circumstances, DVD-R and/or DVD+R media capable of recording and reading data with a laser beam having a wavelength of 630–690 nm are desired. Various organic dyes have been hitherto proposed for use in a recording layer of an optical recording medium. The known media are designed such that the wavelength corresponding to the longer side end region of an absorption band in an absorption spectrum of a dye film, as shown in FIG. 1, is utilized for recording and reading information so as to obtain a high reflectance, which is one of the important characteristics of an optical recording medium using organic dyes. In this case, however, there arises a problem that the medium is greatly influenced by the wavelength of the laser beam.

It is known that the oscillation wavelength of a semiconductor laser for use in DVD-R and/or DVD+R varies depending upon the environment. In particular, at a high temperature, the oscillation wavelength shifts toward a longer wavelength side and, therefore, the absorbance coefficient of the dye used in the recording layer decreases, causing a reduction of the recording sensitivity thereof.

SUMMARY OF THE INVENTION

It is an object of the present invention to provide an optical recording medium suited for DVD-R and/or DVD+R system using a semiconductor laser having an oscillation wavelength in a short wavelength region.

Another object of the present invention is to provide an optical recording medium with reduced dependency on wavelength.

It is a further object of the present invention to provide an optical recording method and an optical recording device each using the above-described optical recording medium.

In accomplishing the foregoing objects, there is provided in accordance with the present invention an optical recording medium comprising a substrate, and a recording layer provided on said substrate wherein said recording layer comprises:

(a) a formazan metal chelate which comprises a formazan compound and a metal component, (b) a squarylium metal chelate which comprises a squarylium compound and a metal component; and (c) at least one additional dye selected from the group consisting of a phthalocyanine compound and a pentamethine cyanine compound.

In another aspect, the present invention provides an optical recording medium comprising a substrate, and a recording layer provided on said substrate wherein said recording layer comprises:

(a) a first formazan metal chelate which comprises a first formazan compound and a first metal component and which in the form of a film has the maximum absorption wavelength in the range of 500 to 650 nm, (b) a squarylium metal chelate which comprises a squarylium compound and a metal component and which in the form of a film has the maximum absorption wavelength in the range of 500 to 650 nm; and (c) a second formazan metal chelate which comprises a second formazan compound and a second metal component and which in the form of a film has the maximum absorption wavelength in the range of 650 to 750 nm.

The present invention also provides an optical recording medium comprising a substrate, and a recording layer provided on said substrate wherein said recording layer comprises:

(a) a first formazan metal chelate which comprises a first formazan compound and a first metal component and which in the form of a film has the maximum absorption wavelength in the range of 500 to 650 nm, (b) a squarylium metal chelate which comprises a squarylium compound and a metal component and which in the form of a film has the maximum absorption wavelength in the range of 500 to 650 nm; and (c) at least one additional dye which in the form of a film has the maximum absorption wavelength greater than 650 nm but not greater than 750 nm and which is selected from the group consisting of a phthalocyanine compound, a pentamethine cyanine compound and a second formazan metal chelate which comprises a second formazan compound and a second metal component.

The present invention also provides an optical recording method comprising the step of exposing the above optical recording medium to a light beam having a wavelength of 600 to 720 nm.

The present invention further provides an optical recording device comprising the above optical recording medium.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
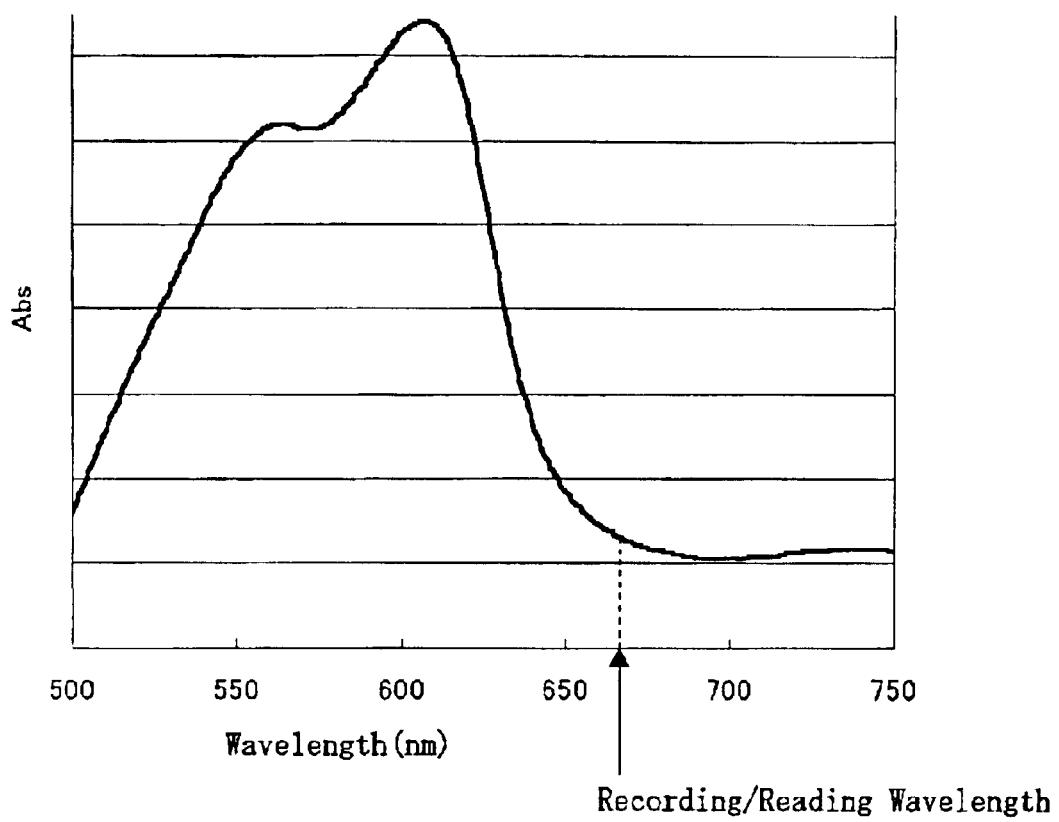
FIG. 1 is an absorption spectrum of a film of a dye used for a recording layer of conventional optical recording medium.

First Embodiment:

An optical recording medium according to the first aspect of the present invention includes a substrate, and a recording layer provided on the substrate. The recording layer comprises:

(a) a formazan metal chelate which includes a formazan compound and a metal component, (b) a squarylium metal chelate which includes a squarylium compound and a metal component; and (c) at least one additional dye selected from a phthalocyanine compound and a pentamethine cyanine compound.

Formazan Metal Chelates:

Any conventionally known formazan metal chelate may be suitably used for the purpose of the present invention. Preferably, the formazan metal chelate is represented by one of the following formulas (I) and (II):

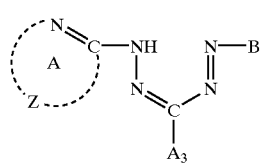

(I)

wherein Z represents a residue forming, together with the carbon atom and the nitrogen atom to which said residue is bonded, a 5-membered or 6-membered nitrogen-containing heterocyclic ring A which may have one or more substituents and which may be condensed with another ring; $A_3$ represents an alkyl group which may have one or more substituents, an aryl group which may have one or more substituents, an alkylcarbonyl group which may have one or more substituents, an arylcarbonyl group which may have one or more substituents, an alkenyl group which may have one or more substituents, a heterocyclic group which may have one or more substituents, or an alkoxycarbonyl group which may have one or more substituents; and B represents an alkyl group which may have one or more substituents, an alkenyl group which may have one or more substituents or an aryl group which may have one or more substituents,

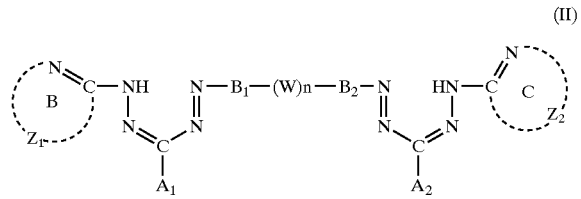

(II)

wherein $Z_1$ represents a residue forming, together with the carbon atom and the nitrogen atom to which said residue is bonded, a 5-membered or 6-membered nitrogen-containing heterocyclic ring B which may have one or more substituents and which may be condensed with another ring; $Z_2$ represents a residue forming, together with the carbon atom and the nitrogen atom to which said residue is bonded, a 5-membered or 6-membered nitrogen-containing heterocyclic ring C which may have one or more substituents and which may be condensed with another ring; $A_1$ and $A_2$ each independently represent an alkyl group which may have one or more substituents, an aryl group which may have one or more substituents, an alkylcarbonyl group which may have one or more substituents, an arylcarbonyl group which may have one or more substituents, an alkenyl group which may have one or more substituents, a heterocyclic group which may have one or more substituents, or an alkoxycarbonyl group which may have one or more substituents; $B_1$ and $B_2$ each independently represent an alkylene group which may have one or more substituents, an alkenylene group which may have one or more substituents or an arylene group which may have one or more substituents; W represents —$CH_2$— or —$SO_2$—; and n is an integer of 0 or 1.

Each of the residues Z, $Z_1$ and $Z_2$ which form, together with the —N=C— linkage, the heterocyclic rings A, B and C, respectively, may comprise not only carbon atom or atoms but also one or more hetero atoms such as nitrogen (—N—), oxygen (—O—), sulfur (—S—) and selenium (—Se—) as ring-forming atoms.

Each of the heterocyclic rings A, B and C may be condensed with another ring such as an alicyclic ring, an aromatic ring or a heterocyclic ring. Each of the alicyclic ring and the aromatic ring is generally a 6-membered to 20-membered ring, preferably a 6-membered to 10-membered ring. The heterocyclic ring as said another ring is generally a 5-membered to 20-membered ring, preferably a 5-membered to 14-membered ring, more preferably a 5-membered or 6-membered ring. Examples of the another ring include a benzene ring, a naphthalene ring, a cyclohexene ring, a pyrrolidine ring, a thiazole ring, an imidazole ring, an oxazole ring, a pyrazole ring, a pyridine ring, a pyridazine ring, a pyrimidine ring, a pyrazine ring, a quinoline ring, an indole ring and a carbazole ring.

Specific examples of the heterocyclic rings A, B and C include a thiazole ring, an imidazole ring, a thiadiazole ring, an oxazole ring, a triazole ring, a pyrazole ring, an oxadiazole ring, a pyridine ring, a pyridazine ring, a pyrimidine ring, a pyrazine ring and a triazine ring.

Specific examples of the substituent usable for bonding to the heterocyclic rings A, B and C include halogen atoms, a nitro group, a cyano group, a hydroxyl group, a carboxyl group, an amino group, a carbamoyl group, alkyl groups which may have one or more substituents, aryl groups which may have one or more substituents, heterocyclic groups which may have one or more substituents, alkoxy groups which may have one or more substituents, aryloxy groups which may have one or more substituents, alkylthio groups which may have one or more substituents, arylthio groups which may have one or more substituents, alkylamino groups which may have one or more substituents, arylamino groups which may have one or more substituents, alkoxycarbonyl groups which may have one or more substituents, aryloxycarbonyl groups which may have one or more substituents, alkylcarboxamido groups which may have one or more substituents, arylcarboxamido groups which may have one or more substituents, alkylsulfonamido groups which may have one or more substituents, alkylcarbamoyl groups which may have one or more substituents, arylcarbamoyl groups which may have one or more substituents, alkenyl groups which may have one or more substituents, and alkylsulfamoyl groups which may have one or more substituents.

Examples of $A_1$, $A_2$ and $A_3$ in the above formulas (I) and (II) include alkyl groups which may have one or more substituents, aryl groups which may have one or more substituents, alkylcarbonyl groups which may have one or more substituents, arylcarbonyl groups which may have one or more substituents, alkenyl groups which may have one or more substituents, heterocyclic groups which may have one or more substituents and alkoxycarbonyl groups which may have one or more substituents. The alkyl group and the alkenyl group may be linear, branched or cyclic. The alkyl group preferably has 1 to 15 carbon atoms, more preferably 1 to 8 carbon atoms. The alkenyl group preferably has 2 to 8 carbon atoms, more preferably 2 to 6 carbon atoms.

Examples of B in the formula (I) include alkyl groups which may have one or more substituents, alkenyl groups which may have one or more substituents and aryl groups which may have one or more substituents. The alkyl group and the alkenyl group may be linear, branched or cyclic. The alkyl group preferably has 1 to 15 carbon atoms, more preferably 1 to 8 carbon atoms. The alkenyl group preferably has 2 to 8 carbon atoms, more preferably 2 to 6 carbon atoms. The aryl group preferably has 6 to 18 carbon atoms, more preferably 6 to 14 carbon atoms.

Examples of $B_1$ and $B_2$ in the above formula (II) include alkylene groups which may have one or more substituents, alkenylene groups which may have one or more substituents and arylene groups which may have one or more substituents. The alkylene group and the alkenylene group may be linear, branched or cyclic. The alkylene group preferably has 1 to 15 carbon atoms, more preferably 1 to 8 carbon atoms. The alkenylene group preferably has 2 to 8 carbon atoms, more preferably 2 to 6 carbon atoms. The arylene group preferably has 6 to 18 carbon atoms, more preferably 6 to 14 carbon atoms.

Each of the above-mentioned alkyl groups preferably has 1 to 15 carbon atoms. Specific examples of such alkyl groups include straight chain alkyl groups such as a methyl group, an ethyl group, an n-propyl group, an n-butyl group, an n-pentyl group, an n-hexyl group, an n-heptyl group, an n-octyl group, an n-nonyl group and an n-decyl group; branched alkyl groups such as an isobutyl group, an isoamyl group, a 2-methylbutyl group, a 2-methylpentyl group, a 3-methylpentyl group, a 4-methylpentyl group, a 2-ethylbutyl group, a 2-methylhexyl group, a 3-methylhexyl group, a 4-methylhexyl group, a 5-methylhexyl group, a 2-ethylpentyl group, a 3-ethylpentyl group, a 2-methylheptyl group, a 3-methylheptyl group, a 4-methylheptyl group, a 5-methylheptyl group, a 2-ethylhexyl group, a 3-ethylhexyl group, an isopropyl group, a sec-butyl group, a 1-ethylpropyl group, a 1-methylbutyl group, a 1,2-dimethylpropyl group, a 1-methylheptyl group, a 1-ethylbutyl group, a 1,3-dimethylbutyl group, a 1,2-dimethylbutyl group, a 1-ethyl-2-methylpropyl group, a 1-methylhexyl group, a 1-ethylheptyl group, a 1-propylbutyl group, a 1-isopropyl-2-methylpropyl group, a 1-ethyl-2-methylbutyl group, a 1-propyl-2-methylpropyl group, a 1-methylheptyl group, a 1-ethylhexyl group, a 1-propylpentyl group, a 1-isopropylpentyl group, a 1-isopropyl-2-methylbutyl group, a 1-isopropyl-3-methylbutyl group, a 1-methyloctyl group, a 1-ethylheptyl group, a 1-propylhexyl group, a 1-isobutyl-3-methylbutyl group, a neopentyl group, a tert-butyl group, a tert-hexyl group, a tert-amyl group and a tert-octyl group; and cycloalkyl groups such as a cyclohexyl group, a 4-methylcyclohexyl group, a 4-ethylcyclohexyl group, a 4-tert-butylcyclohexyl group, a 4-(2-ethylhexyl) cyclohexyl group, a bornyl group and an isobornyl group and an adamantyl group. Among these, alkyl groups having 1 to 8 carbon atoms are especially preferred.

The above-described alkyl groups may have one or more substituents such as a hydroxyl group, a halogen atom, a nitro group, a carboxyl group, a cyano group, an aryl group which may have one or more substituents (for example, a halogen atom or a nitro group) and a heterocyclic group. Further, the alkyl group may have one or more substituents of the formula -Z-R where Z represents a heteroatom such as an oxygen atom, a sulfur atom or a nitrogen atom and R represents a hydrocarbyl group such as an alkyl group of the above-described type.

Examples of the alkyl group having an —O—R substituent include an alkoxyalkyl group and an aryloxyalkyl group such as a methoxymethyl group, a methoxyethyl group, an ethoxymethyl group, an ethoxyethyl group, a butoxyethyl group, an ethoxyethoxyethyl group, a phenoxyethyl group, a methoxypropyl group and an ethoxypropyl group. The alkoxyalkyl group and aryloxyalkyl group may have one or more substituents such as a halogen atom or a nitro group.

Examples of the alkyl group having an —S—R substituent include an alkylthioalkyl group and an arylthioalkyl group such as a methylthioethyl group, an ethylthioethyl group, an ethylthiopropyl group and a phenylthioethyl group. The alkylthioalkyl group and arylthioalkyl group may have one or more substituents such as a halogen atom or a nitro group.

Examples of the alkyl group having an —N—R substituent include an alkylaminoalkyl group and an arylaminoalkyl group such as a dimethylaminoethyl group, a diethylaminoethyl group, a diethylaminopropyl group and a phenylaminomethyl. The alkylaminoalkyl group and arylaminoalkyl group may have one or more substituents such as a halogen atom or a nitro group.

As the above-mentioned alkylene groups, those obtained by removing one hydrogen atom from the above-described alkyl groups can be mentioned as examples.

Each of the above-mentioned alkenyl groups preferably has 2 to 8 carbon atoms. Specific examples of such alkenyl groups include a vinyl group, an allyl group, a 1-propenyl group, a methacryl group, a crotyl group, a 1-butenyl group, a 3-butenyl group, a 2-pentenyl group, a 4-pentenyl group, a 2-hexenyl group, a 5-hexenyl group, a 2-heptenyl group and a 2-octenyl group. Substituents for these alkenyl groups are similar to those for the above-described alkyl groups.

As the above-mentioned alkenylene groups, those obtained by removing one hydrogen atom from the above-described alkenyl groups can be mentioned as examples.

Examples of the above-mentioned aryl groups include a phenyl group, a naphthyl group, an anthryl group, a fluorenyl group, a phenalenyl group, a phenanthranyl group, a triphenylenyl group and a pyrenyl group.

As the above-mentioned arylene group, those obtained by removing one hydrogen atom from the above-described aryl groups can be mentioned as examples.

The above-described aryl and arylene groups may have one or more substituents such as an alkyl group, an alkenyl group, a hydroxyl group, a halogen atom, a nitro group, a carboxyl group, a cyano group, a trifluoromethyl group, an aryl group which may have a substituent (for example, a halogen atom or a nitro group), a heterocyclic group which may have a substituent (for example, a halogen atom or a nitro group) and a group of the formula -Z-R where Z represents a heteroatom such as an oxygen atom, a sulfur atom or a nitrogen atom and R represents a hydrocarbyl group such as an alkyl group. The alkyl group, alkenyl group and aryl group herein may be the same as those explained above.

Examples of the above-mentioned heterocyclic groups include a furyl group, a thienyl group, a pyrrolyl group, a benzofuranyl group, an isobenzofuranyl group, a benzothienyl group, an indolinyl group, an isoindolinyl group, a carbazolyl group, a pyridyl group, a piperidyl group, a quinolyl group, an isoquinolyl group, an oxazolyl group, an isoxazolyl group, a thiazolyl group, an isothiazolyl group, an imidazolyl group, a pyrazolyl group, a benzimidazolyl group, a pyrazyl group, a pyrimidinyl group, a pyridazinyl group and a quinoxalinyl group.

These heterocyclic groups may have one or more substituents such as a hydroxyl group, an alkyl group, a halogen atom, a nitro group, a carboxyl group, a cyano group, an aryl group which may have a substituent (for example, a halogen atom or a nitro group), a heterocyclic group which may have a substituent (for example, a halogen atom or a nitro group) and a group of the formula -Z-R where Z represents a heteroatom such as an oxygen atom, a sulfur atom or a nitrogen atom and R represents a hydrocarbyl group such as an alkyl group.

Specific examples of the above-mentioned halogen atoms include fluorine, chlorine, bromine and iodine.

As the above-mentioned alkoxy group which may have one or more substituents, those having an alkyl group, which may have one or more substituents, directly bonded to an oxygen atom may be used. Specific examples of the alkyl group and substituent are similar to those described above.

As the aryloxyl group which may have one or more substituents, those having an aryl group, which may have one or more substituents, directly bonded to an oxygen atom may be used. Specific examples of the aryl group and substituent are similar to those described above.

As the alkylthio group which may have one or more substituents, those having an alkyl group, which may have one or more substituents, directly bonded to a sulfur atom may be used. Specific examples of the alkyl group and substituent are similar to those described above.

As the arylthio group which may have one or more substituents, those having an aryl group, which may have one or more substituents, directly bonded to a sulfur atom may be used. Specific examples of the aryl group and substituent are similar to those described above.

As the alkylamino group which may have one or more substituents, those having an alkyl group, which may have one or more substituents, directly bonded to a nitrogen atom may be used. Specific examples of the alkyl group and substituent are similar to those described above. In this case, the alkyl groups may be linked to form a ring with a heteroatom such as an oxygen atom or a nitrogen atom. Examples of the ring include a piperidino group, a morpholino group, a pyrrolidinyl group, a piperazinyl group, an indolinyl group, and an isoindolinyl group.

As the arylamino group which may have one or more substituents, those having an aryl group, which may have one or more substituents, directly bonded to a nitrogen atom may be used. Specific examples of the aryl group and substituent are similar to those described above.

As the alkylcarbonyl group which may have one or more substituents, those having an alkyl group, which may have one or more substituents, directly bonded to the carbon atom of the carbonyl group may be used. Specific examples of the alkyl group and substituent are similar to those described above.

As the arylcarbonyl group which may have one or more substituents, those having an aryl group, which may have one or more substituents, directly bonded to the carbon atom of the carbonyl group may be used. Specific examples of the aryl group and substituent are similar to those described above.

As the alkoxycarbonyl group which may have one or more substituents, those having an alkyl group, which may have one or more substituents, directly bonded to the oxygen atom of —O(C=O)— may be used. Specific examples of the alkyl group and substituent are similar to those described above.

As the aryloxycarbonyl group which may have one or more substituents, those having an aryl group, which may have one or more substituents, directly bonded to the oxygen atom of —O(C=O)— may be used. Specific examples of the aryl group and substituent are similar to those described above.

As the alkylcarboxamido group which may have one or more substituents, those having an alkyl group, which may have one or more substituents, directly bonded to the carbon atom of the carboxamido group may be used. Specific examples of the alkyl group and substituent are similar to those described above.

As the arylcarboxamido group which may have one or more substituents, those having an aryl group, which may have one or more substituents, directly bonded to the carbon atom of the carboxamido group may be used. Specific examples of the aryl group and substituent are similar to those described above.

As the alkylcarbamoyl group which may have one or more substituents, those having an alkyl group, which may have one or more substituents, directly bonded to the nitrogen atom of the carbamoyl group may be used. Specific examples of the alkyl group and substituent are similar to those described above. In this case, alkyl groups may be linked to form a ring with a heteroatom such as an oxygen atom or a nitrogen atom. Examples of the ring include a piperidino group, a morpholino group, a pyrrolidinyl group, a piperazinyl group, an indolinyl group, and an isoindolinyl group.

As the arylcarbamoyl group which may have one or more substituents, those having an aryl group, which may have one or more substituents, directly bonded to the nitrogen atom of the carbamoyl group may be used. Specific examples of the aryl group and substituent are similar to those described above.

As the alkylsulfamoyl group which may have one or more substituents, those having an alkyl group, which may have one or more substituents, directly bonded to the nitrogen atom of the sulfamoyl group may be used. Specific examples of the aryl group and substituent are similar to those described above.

As the alkylsulfonamido group which may have one or more substituents, those having an alkyl group, which may have one or more substituents, directly bonded to the nitrogen atom of the sulfonamido group may be used. Specific examples of the aryl group and substituent are similar to those described above.

The metal component constituting the formazan metal chelate may be a metal or a metal compound. Specific examples of the metal component include titanium, vanadium, chromium, manganese, iron, cobalt, nickel, copper, zinc, zirconium, niobium, molybdenum, technetium, ruthenium, rhodium, palladium, oxides of these metals and halides of these metals. Above all, vanadium, manganese, iron, cobalt, nickel, copper, zinc or palladium is preferred because an optical recording medium using the formazan metal chelate comprising such metal is excellent in optical characteristics. Of the halides, chlorides are preferred.

The formazan metal chelate, when formed into a film, preferably has the maximum absorption wavelength in the range of 500 to 650 nm.

Specific examples of the formazan metal chelates are shown in Tables 1 through 4. In the tables, Ph represents a phenyl group.

TABLE 1
| Formazan Metal Chelate No. | Formazan Compound | Metal Component |
|---|---|---|
| A-1 | 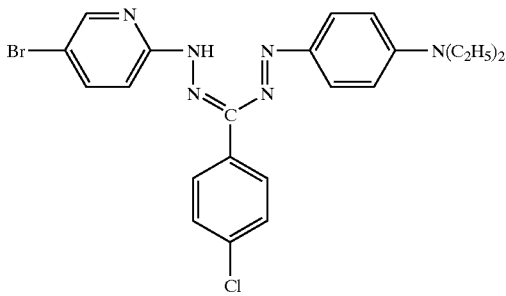 | VCl$_3$ |
| A-2 | 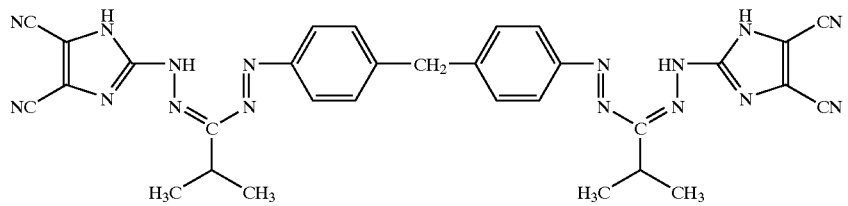 | Co |
| A-3 | 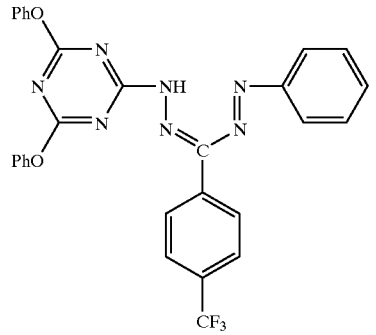 | Ni |
| A-4 | 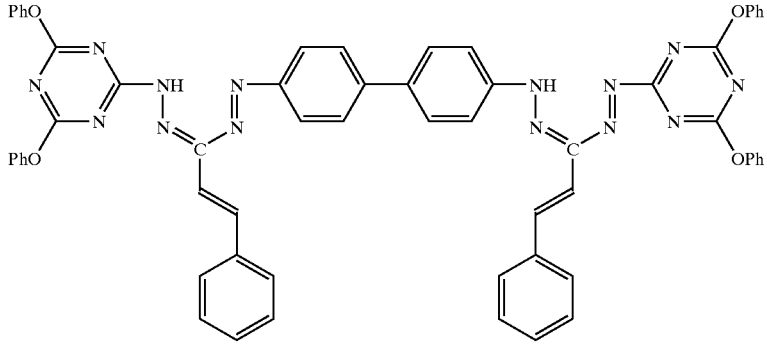 | Cu |

TABLE 2

| Formazan Metal Chelate No. | Formazan Compound | Metal Component |
|---|---|---|
| A-5 | ![structure] | Ni |
| A-6 | ![structure] | Co |
| A-7 | ![structure] | Cu |
| A-8 | ![structure] | Ni |
| A-9 | ![structure] | Co |

TABLE 3

| Formazan Metal Chelate No. | Formazan Compound | Metal Component |
| --- | --- | --- |
| A-10 | 2-pyridyl-NH-N=C(C(=O)phenyl)-N=N-(4-methoxyphenyl) | Cu |
| A-11 | (4,6-dimethoxy-1,3,5-triazin-2-yl)-NH-N=C(4-pyridyl)-N=N-(3,4-dichlorophenyl) | Cu |
| A-12 | 2-pyridyl-NH-N=C(C(=O)O-CH(CH₃)₂)-N=N-(2-chlorophenyl) | Ni |
| A-13 | 2-pyridyl-NH-N=C(4-cyanophenyl)-N=N-(4-N(C₄H₉)₂-phenyl) | FeCl₃ |

TABLE 4

| Formazan Metal Chelate No. | Formazan Compound | Metal Component |
|---|---|---|
| A-14 | | Mn |
| A-15 | | Co |
| A-16 | | Ni |

Squarylium Metal Chelates:

Any conventionally known squarylium metal chelate may be suitably used for the purpose of the present invention. Preferably, the squarylium metal chelate is represented by the following formula (III):

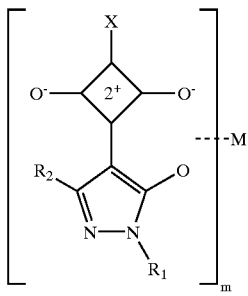

wherein $R_1$ and $R_2$ each independently represent a hydrogen atom, an aliphatic group which may have one or more substituents, an aralkyl group which may have one or more substituents, an aryl group which may have one or more substituents or a heterocyclic group which may have one or more substituents; M represents a metal atom having a coordination capacity; X represents an aryl group which may have one or more substituents, a heterocyclic group which may have one or more substituents, or $Z_3$=CH—($Z_3$ representing a heterocyclic group which may have one or more substituents); and m is an integer of 2 or 3.

In the formula (III) X is preferably represented by the following formula (IV):

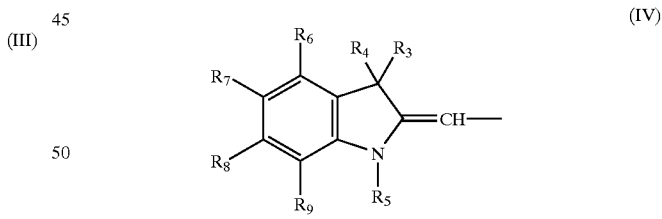

wherein $R_3$ and $R_4$ each independently represents an aliphatic group which may have one or more substituents, or $R_3$ and $R_4$ may be taken together with an adjacent carbon atom to form a hydrocarbon ring or a heterocyclic ring; $R_5$ represents a hydrogen atom, an aliphatic group which may have one or more substituents, an aralkyl group which may have one or more substituents, or an aryl group which may have one or more substituents; $R_6$ through $R_9$ each independently represent a halogen atom, an aliphatic group which may have one or more substituents, an aralkyl group which may have one or more substituents, an aryl group which may have one or more substituents, a nitro group, a cyano group, or an alkoxy group which may have one or more substituents, or adjacent two of $R_6$ through $R_9$ may be taken together with two adjacent carbon atoms to form a ring which may have one or more substituents.

The above-mentioned aliphatic group includes an alkyl group and an alkenyl group and may be linear, branched or cyclic aliphatic group. The linear or branched aliphatic group preferably has 1 to 6 carbon atoms. The cyclic aliphatic group preferably has 3 to 8 carbon atoms.

Examples of the aliphatic group include a methyl group, an ethyl group, a propyl group, an isopropyl group, a butyl group, an iso-butyl group, a sec-butyl group, a tert-butyl group, a pentyl group, an isopentyl group, a 1-methylbutyl group, a 2-methylbutyl group, a tert-pentyl group, a hexyl group, a cyclopropyl group, a cyclobutyl group, a cyclopentyl group, a cyclohexyl group, a cycloheptyl group, a cyclooctyl group, a vinyl group, an allyl group, a 1-propenyl group, a methacryl group, a crotyl group, a 1-butenyl group, a 3-butenyl group, a 2-pentenyl group, a 4-pentenyl group, a 2-hexenyl group, a 5-hexenyl group, a 2-heptenyl group and a 2-octenyl group.

The alkoxy group is a group having a linear, branched or cyclic alkyl group bonded to oxygen (—O—). The linear or branched alkyl group preferably has 1 to 6 carbon atoms. The cyclic alkyl group preferably has 3 to 8 carbon atoms. Examples of the alkyl group are similar to those described above.

Examples of the aralkyl group include aralkyl groups having 7 to 15 carbon atoms, such as a benzyl group, a phenethyl group, a phenylpropyl group and a naphthylmethyl group.

Examples of the aryl group include aryl groups having 6 to 18 carbon atoms, such as a phenyl group, a naphthyl group, an anthryl group and an azulenyl group.

Examples of the halogen atom include chlorine, bromine, fluorine and iodine.

As for the hydrocarbon ring which is formed by adjacent two of $R_6$ through $R_9$ being taken together with two adjacent carbon atoms, an aromatic ring having 6 to 14 carbon atoms such as a benzene ring and an alicyclic ring having 3 to 10 carbon atoms such as a cyclohexane ring may be mentioned as examples.

Examples of the heterocyclic ring in the above-mentioned heterocyclic groups and of the heterocyclic ring formed by $R_3$ and $R_4$ being taken together with an adjacent carbon atom include 5- or 6-membered monocyclic aromatic or aliphatic heterocyclic rings containing at least one heteroatom such as a nitrogen atom, an oxygen atom or a sulfur atom; and fused bicyclic or tricyclic, aromatic or aliphatic heterocyclic rings wherein 3- to 8-membered rings are condensed, containing at least one heteroatom such as a nitrogen atom, an oxygen atom or a sulfur atom. Specific examples of the heterocyclic rings include a pyridine ring, a pyrazine ring, a pyrimidine ring, a pyridazine ring, a quinoline ring, an isoquinoline ring, a phthalazine ring, a quinazoline ring, a quinoxaline ring, naphthyridine ring, cinnoline ring, pyrrole ring, pyrazole ring, an imidazole ring, a triazole ring, a tetrazole ring, a thiophene ring, a furan ring, a thiazole ring, an oxazole ring, an indole ring, an isoindole ring, an indazole ring, benzimidazole ring, benzotriazole ring, a benzothiazole ring, a benzoxazole ring, a purine ring, a carbazole ring, a pyrrolidine ring, a piperidine ring, a piperazine ring, a morpholine ring, a thiomorpholine ring, a homopiperidine ring, a homopiperazine ring, a tetrahydropyridine ring, a tetrahydroquinoline ring, a tetrahydroisoquinoline ring, a tetrahydrofurane ring, a tetrahydropyrane ring, a dihydrobenzofurane ring and a tetrahydrocarbazole ring.

Examples of the heterocyclic group as $Z_3$ in the formula (III) include indolin-2-ylidene, benz[e]indolin-2-ylidene, 2-benzothiazolinylidene, naphtho[2,1-d]thiazol-2(3H)-ylidene, naphtho[1,2-d]thiazol-2(1H)-ylidene, 1,4-dihydroquinolin-4-ylidene, 1,2-dihydroquinolin-2-ylidene, 2,3-dihydro-1H-imidazo[4,5-d]quinoxalin-2-ylidene and 2-benzoselenazolinylidene.

Examples of the alicyclic hydrocarbon ring formed by $R_3$ and $R_4$ being taken together with an adjacent carbon atom include those having 3 to 8 carbon atoms which may be saturated or unsaturated, more specifically, a cyclopropane ring, a cyclobutane ring, a cyclopentane ring, a cyclohexane ring, a cycloheptane ring, a cyclooctane ring, a cyclopentene ring, a 1,3-cyclopentadiene ring, a cyclohexene ring, and a cyclohexadiene ring.

The substituents for the aralkyl group, aryl group, alkoxy group, heterocyclic group or a ring which is formed by adjacent two of $R_6$ through $R_9$ being taken together with two adjacent carbon atoms may be the same or may be different. Examples of the substituent include a hydroxyl group, a carboxyl group, halogen atoms, alkyl groups, alkoxy groups, a nitro group, a trifluoromethyl group, and an amino group which may have one or more substituents. The halogen atoms, alkyl groups and alkoxy groups are similar to those described above.

Examples of the substituent for the aliphatic group and alkyl group include a hydroxyl group, a carboxyl group, halogen atoms and alkoxy groups. The halogen atoms and alkoxy groups are similar to those described above.

Examples of the substituent for the amino group may be one or two alkyl groups which may be the same or different. The alkyl groups usable here are similar to those described above.

As a metal atom (M), any metal may be used as long as it is coordinatable with the squarylium compound. Specific examples of the metal atom M include aluminum, zinc, copper, iron, nickel, chromium, cobalt, manganese, iridium, vanadium and titanium. Aluminum is particularly preferred because an optical recording medium using the squarylium metal chelate comprising aluminum is excellent in optical characteristics.

A generally employed process for preparing the compound represented by the formula (III) will be described below. Hereinafter, the compound represented by the formula (III) may be referred to Compound (III). This also applies to the compounds with other formula numbers.

Reaction scheme (1-a):

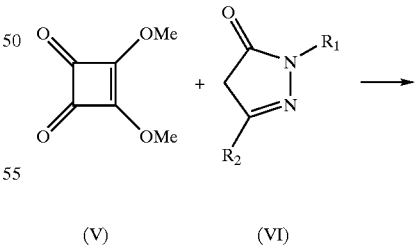

(V)         (VI)

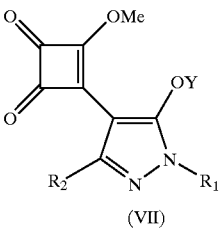

(VII)

Reaction scheme (1-b):

Compound (VII) ⟶ 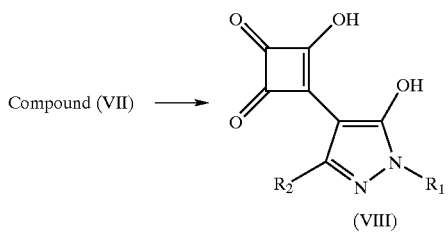
(VIII)

Reaction scheme (1-c):

Compound (VIII) + X—H ⟶ 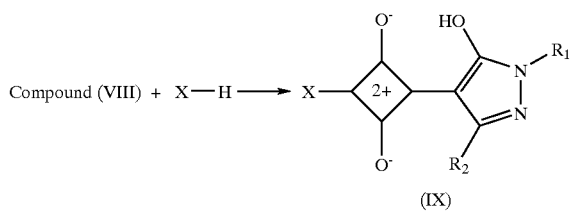
(IX)

Reaction scheme (1-d):

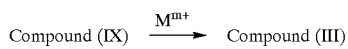

In the above-described reaction schemes, $R_1$, $R_2$, X, M and m have the same meanings as described above, Y represents hydrogen, potassium, sodium or the like and Me represents a methyl group.

In the reaction scheme (1-a), Compound (VII) is available by reacting Compound (V) with 0.5 to 2 times the mole of Compound (VI), in the presence of a base if necessary, in a solvent at room temperature to 40° C. for 30 minutes to 15 hours. Examples of the base include 1 to 2-fold mole of inorganic bases such as potassium carbonate, sodium carbonate and potassium hydroxide and 1 to 2-fold mole of organic bases such as triethylamine and sodium methoxide. As the solvent, methanol, ethanol, dimethylformamide or the like may be used.

In the above-described reaction scheme (1-b), Compound (VIII) is available by treating Compound (VII) in an alkaline solvent or an acidic solvent at room temperature to 40° C. for 30 minutes to 15 hours. Examples of the alkaline solvent usable here include an aqueous solution of potassium carbonate, an aqueous solution of sodium carbonate, and an aqueous solution of potassium hydroxide, while those of the acidic solvent include a 50% vol/vol aqueous dimethyl sulfoxide solution of hydrochloric acid and a 50% vol/vol dimethylformamide solution of hydrochloric acid.

In the reaction scheme (1-c), Compound (IX) is available by reacting Compound (VIII) with 0.5 to 2 times the mole of X—H in the presence of 0.5 to 2 times the mole of a base if necessary, in a solvent, at 80 to 120° C. for 1 to 15 hours. Examples of the solvent include $C_2$ to $C_8$ alcohol solvents such as ethanol, propanol, isopropanol, butanol and octanol and mixed solvents of any one of these alcohol solvents with benzene, toluene or xylene (containing at least 50 vol/vol % of the alcohol). Examples of the base include organic bases such as quinoline, triethylamine and pyridine and inorganic bases such as potassium carbonate, potassium bicarbonate and sodium bicarbonate.

In the above-described reaction scheme (1-d), Compound (III) is available by reacting Compound (IX) with 0.5/m to 2/m times the mole of $M^{m+}$ in the presence of 0.5 to 2 times the mole of acetic acid if necessary, in a solvent at room temperature to 120° C. for 1 to 15 hours. Examples of the material for providing $M^{m+}$ include aluminum trisacetylacetonate, aluminum trisethylacetoacetate, aluminum isopropoxide, aluminum sec-butoxide, aluminum ethoxide, aluminum chloride, copper chloride, copper acetate and nickel acetate. Examples of the solvent include halogen solvents such as chloroform and dichloromethane, aromatic solvents such as toluene and xylene, ether solvents such as tetrahydrofuran and methyl-tert-butyl ether and ester solvents such as ethyl acetate.

The squarylium metal chelate, when formed into a film, preferably has the maximum absorption wavelength in the range of 500 to 650 nm.

Specific examples of the squarylium metal chelates are shown in Tables 5 through 7. In the tables nPr, iPr, nBu and Ph represent n-propyl, isopropyl, n-butyl and phenyl groups, respectively.

TABLE 5

| Squarylium Metal Chelate No. | Squarylium Compound | Metal Component |
|---|---|---|
| B-1 | | Al |
| B-2 | | Al |

TABLE 5-continued
| Squarylium Metal Chelate No. | Squarylium Compound | Metal Component |
|---|---|---|
| B-3 | | Ni |
| B-4 | | Al |
| B-5 | | Al |
| B-6 | | Al |
| B-7 | | Al |
TABLE 6
| Squarylium Metal Chelate No. | Squarylium Compound | Metal Component |
|---|---|---|
| B-8 | 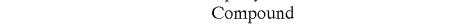 | Al |

TABLE 6-continued
| Squarylium Metal Chelate No. | Squarylium Compound | Metal Component |
|---|---|---|
| B-9 | 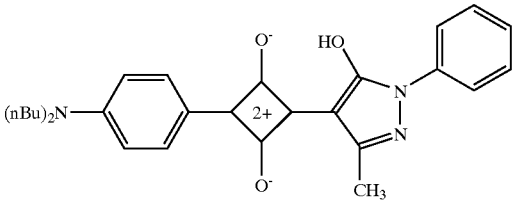 | Cu |
| B-10 | 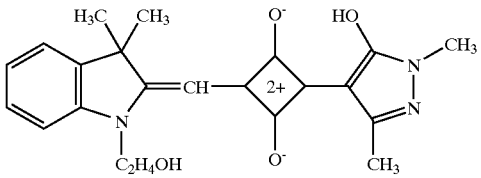 | Al |
| B-11 | 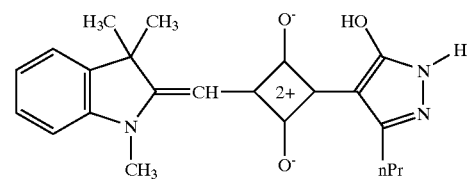 | Al |
| B-12 | 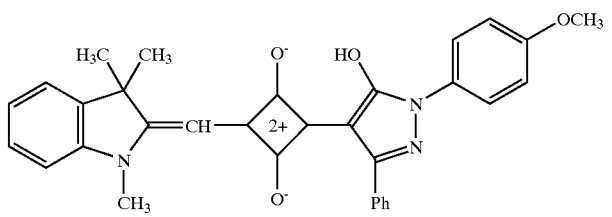 | Al |
| B-13 | 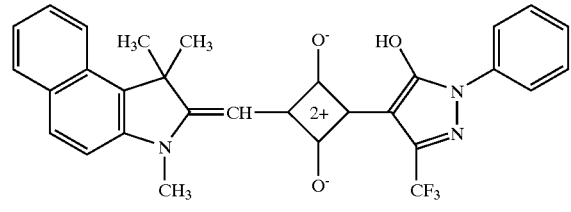 | Al |
| B-14 | 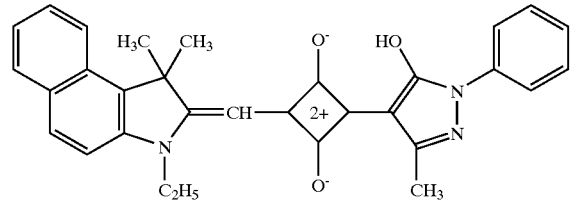 | Cu |

TABLE 7
| Squarylium Metal Chelate No. | Squarylium Compound | Metal Component |
|---|---|---|
| B-15 | 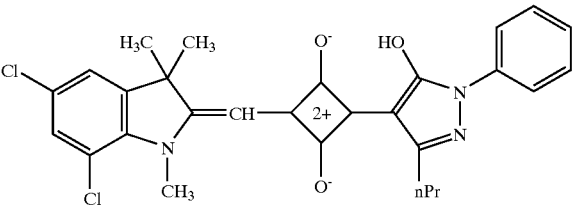 | Al |
| B-16 | 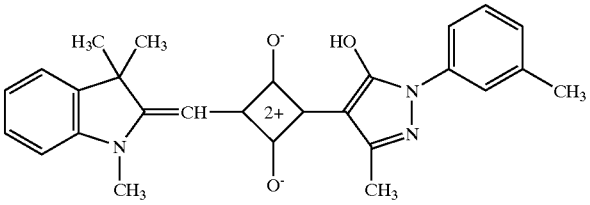 | Al |
| B-17 | 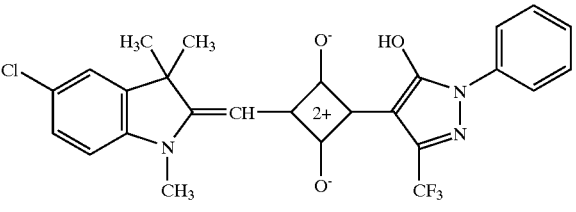 | Al |
| B-18 | 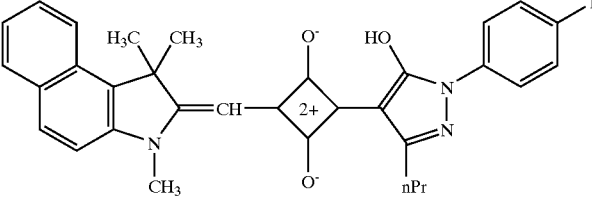 | Al |

Phthalocyanine Compounds:

Any conventionally known phthalocyanine compound may be suitably used for the purpose of the present invention. Preferably, the phthalocyanine compound is represented by the following formula (V):

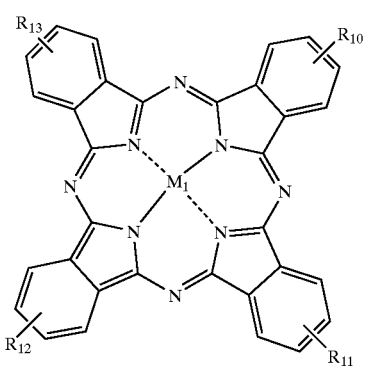

wherein $R_{10}$ through $R_{13}$ each independently represent an alkylsulfinyl group which may have one or more substituents, an alkenylsulfinyl group which may have one or more substituents, an arylsulfinyl group which may have one or more substituents, an alkylsulfonyl group which may have one or more substituents, an alkenylsulfonyl group which may have one or more substituents, an arylsulfonyl group which may have one or more substituents, an alkyloxysulfonyl group which may have one or more substituents, an alkenyloxysulfonyl group which may have one or more substituents, an aryloxysulfonyl group which may have one or more substituents, an alkoxy group which may have one or more substituents, an arylcarbonyloxy group which may have one or more substituents or a pyrazolyl group which may have one or more substituents, and $M_1$ represents a metal component or two hydrogen atoms.

The alkyl part of the alkylsulfinyl group preferably has 1 to 12 carbon atoms, more preferably 1 to 6 carbon atoms and may be linear, branched or cyclic. The alkenyl part of the alkenylsulfinyl group preferably has 2 to 12 carbon atoms, more preferably 2 to 6 carbon atoms. The aryl part of the arylsulfinyl group preferably has 6 to 20 carbon atoms, more preferably 6 to 12 carbon atoms. The alkyl of the alkylsulfonyl group preferably has 1 to 12 carbon atoms, more preferably 1 to 6 carbon atoms and may be linear, branched or cyclic. The alkenyl part of the alkenylsulfonyl group preferably has 2 to 12 carbon atoms, more preferably 2 to 6 carbon atoms. The aryl part of the arylsulfonyl group preferably has 6 to 20 carbon atoms, more preferably 6 to 12 carbon atoms. The alkyl part of the alkyloxysulfonyl group preferably has 1 to 12 carbon atoms, more preferably 1 to 6 carbon atoms and may be linear, branched or cyclic. The alkenyl part of the alkenyloxysulfonyl group preferably has 2 to 12 carbon atoms, more preferably 2 to 6 carbon atoms. The aryl part of the aryloxysulfonyl group preferably has 6 to 20 carbon atoms, more preferably 6 to 12 carbon atoms. The alkyl part of the alkoxy group preferably has 1 to 12 carbon atoms, more preferably 1 to 6 carbon atoms. The aryl part of the arylcarbonyloxy group preferably has 6 to 20 carbon atoms, more preferably 6 to 12 carbon atoms. Examples of the above alkyl, alkenyl and aryl include those described previously with reference to the formulas (I) and (II). Examples of the substituents for the groups $R_{10}$ through $R_{13}$ include those described previously with reference to the rings A, B and C.

The metal component $M_1$ may be a metal such as a divalent metal or a metal compound such as an organic metallic compound or a metal oxide. Preferably, $M_1$ in the formula (V) represents V=O or $Q_1$-Si-$Q_2$ where $Q_1$ and $Q_2$ each independently represent an alkoxy group which may have one or more substituents, an aryloxy group which may have one or more substituents, an alkoxycarbonyl group which may have one or more substituents, an aryloxycarbonyl group which may have one or more substituents, an aryloxysulfonyl group which may have one or more substituents or an arylcarbonyloxy group which may have one or more substituents. The above substituent may be, for example, a halogen atom or a nitro group The phthalocyanine compound, when formed into a film, preferably has the maximum absorption wavelength in the range of 650 to 750 nm.

Specific examples of the phthalocyanine compound are shown in Tables 8 and 9. In Tables 8 and 9, shown is only one of the isomers. In the case of a phthalocyanine compound having substituents at its α-position, for example, there exist four isomers (a) to (d) shown below, and such a phthalocyanine compound is generally available as a mixture of the four isomers.

(a)

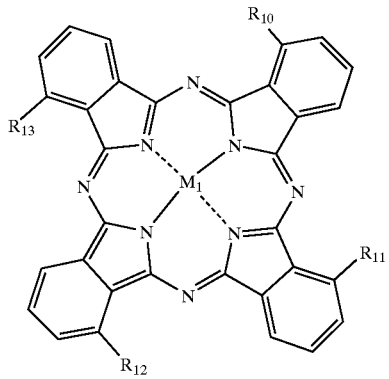

(b)

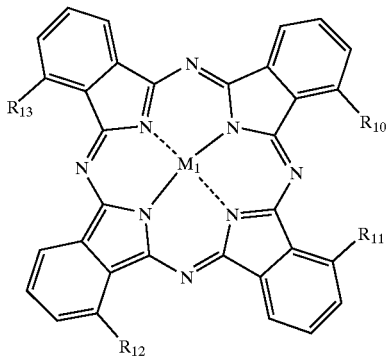

(c)

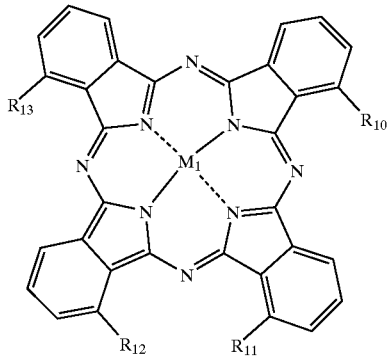

-continued
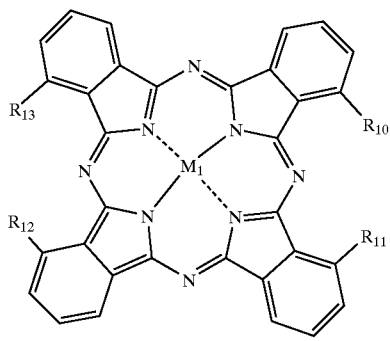
(d)
TABLE 8
| Compound No. | Phthalocyanine Compound |
|---|---|
| C-1 | |
| C-2 | |
TABLE 8-continued
| Compound No. | Phthalocyanine Compound |
|---|---|
| C-3 | |
| C-4 | |
| C-5 | |

TABLE 8-continued

| Compound No. | Phthalocyanine Compound |
|---|---|
| C-6 | (structure) |

TABLE 9

| Compound No. | Phthalocyanine Compound |
|---|---|
| C-7 | (structure) |
| C-8 | (structure) |

TABLE 9-continued

| Compound No. | Phthalocyanine Compound |
|---|---|
| C-9 | (structure) |
| C-10 | (structure) |
| C-11 | (structure) |

TABLE 9-continued

| Compound No. | Phthalocyanine Compound |
|---|---|
| C-12 | (structure) |

Pentamethine Cyanine Compounds:

Any conventionally known pentamethine cyanine compound may be suitably used for the purpose of the present invention. Preferably, the pentamethine cyanine compound is represented by the following formula (VI):

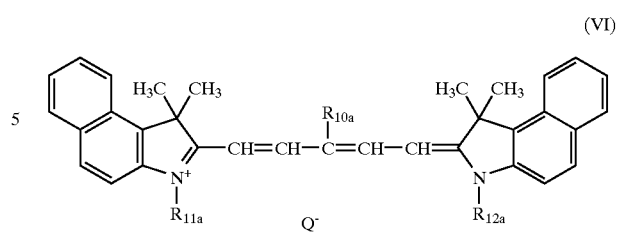

(VI)

wherein $R_{10a}$ represents a hydrogen atom, an aliphatic group which may have one or more substituents or a halogen atom, $R_{11a}$ and $R_{12a}$ each independently represents an aliphatic group which may have one or more substituent and $Q^-$ represents $I^-$, $ClO_4^-$, $BF_4^-$, $PF_6^-$, $SbF_6^-$ or $TsO^-$ (p-toluenesulfonate).

The aliphatic group for $R_{10a}$ through $R_{12a}$ includes an alkyl group and an alkenyl group and may be linear, branched or cyclic aliphatic groups. The linear or branched aliphatic group preferably has 1 to 12 carbon atoms, more preferably 1 to 6 carbon atoms. The cyclic aliphatic group preferably has 3 to 8 carbon atoms. Further, one or more heteroatoms such as an oxygen atom, a nitrogen atom or a sulfur atom may be present in the main chain of the aliphatic group. Examples of the aliphatic group include those described previously with regard to the formula (III) Examples of the substituents for the group $R_{10a}$ through $R_{12a}$ include those described previously with reference to the formula (I).

The pentamethine cyanine compound, when formed into a film, preferably has the maximum absorption wavelength in the range of 650 to 750 nm.

Specific examples of the pentamethine cyanine compound are shown in Tables 10 to 12. In the tables, nHex, iBu and nPr represent an n-hexyl group, an isobutyl group and an n-propyl group, respectively.

TABLE 10

| Compound No. | Pentamethine Compound | Counter Ion |
|---|---|---|
| D-1 | (structure) | $PF_6^-$ |
| D-2 | (structure) | $BF_4^-$ |
| D-3 | (structure) | $SbF_6^-$ |

TABLE 10-continued

| Compound No. | Pentamethine Compound | Counter Ion |
|---|---|---|
| D-4 | (structure: bis-benzindolium pentamethine; N-C2H5 and N-nBu) | PF6− |
| D-5 | (structure: bis-benzindolium pentamethine with central CH3; N-CH3 and N-CH3) | ClO4− |
| D-6 | (structure: bis-benzindolium pentamethine with central CH3; N-C2H5 and N-nHex) | BF4− |

TABLE 11

| Compound No. | Pentamethine Compound | Counter Ion |
|---|---|---|
| D-7 | (structure: bis-benzindolium pentamethine; N-CH3 and N-CH3) | I− |
| D-8 | (structure: bis-benzindolium pentamethine with central CH3; N-C2H5 and N-C2H5) | ClO4− |
| D-9 | (structure: bis-benzindolium pentamethine with central CH3; N-C2H5 and N-C2H5) | SbF6− |

TABLE 11-continued

| Compound No. | Pentamethine Compound | Counter Ion |
|---|---|---|
| D-10 | [structure] | TsO⁻ |
| D-11 | [structure] | PF₆⁻ |

TABLE 12

| Compound No. | Pentamethine Compound | Counter Ion |
|---|---|---|
| D-12 | [structure] | PF₆⁻ |
| D-13 | [structure] | ClO₄⁻ |
| D-14 | [structure] | SbF₆⁻ |

By using an additional dye which is selected from the phthalocyanine compound and the pentamethine cyanine compound having the maximum absorption wavelength (λmax) near the recording and reading wavelength, in conjunction with the mixture of the formazan metal chelate and the squarylium metal chelate, the optical recording medium can show desired sensitivity while maintaining its desired optical characteristics, even when the wavelength of the laser beam varies.

It is preferred that the weight ratio of the formazan metal chelate to the squarylium metal chelate range from 10:90 to 50:50 for reasons of high light resistance and high reflectance. For reasons of excellent optical characteristics and low dependency of the sensitivity to the wavelength, the phthalocyanine compound is preferably present in an amount of 0.5 to 20% by weight, more preferably 3 to 10% by weight, based on a total weight of the formazan metal chelate and the squarylium metal chelate, while the pentamethine cyanine compound is preferably present in an amount of 0.5 to 5% by weight based on a total weight of the formazan metal chelate and the squarylium metal chelate.

Second Embodiment:

An optical recording medium according to the second aspect of the present invention includes a substrate, and a recording layer provided on the substrate. The recording layer comprises:

(a) a first formazan metal chelate which comprises a first formazan compound and a first metal component and which in the form of a film has the maximum absorption wavelength in the range of 500 to 650 nm, (b) a squarylium metal chelate which comprises a squarylium compound and a metal component and which in the form of a film has the maximum absorption wavelength in the range of 500 to 650 nm; and (c) a second formazan metal chelate which comprises a second formazan compound and a second metal component and which in the form of a metal has the maximum absorption wavelength in the range of 650 to 750 nm.

The first formazan metal chelate used in the second embodiment may be any formazan metal chelate as long as it has the maximum absorption wavelength in the range of 500 to 650 nm. Preferably, the first formazan compound is a compound represented by one of the formulas (I) and (II) described above in connection with the first embodiment.

Specific examples of the preferred first formazan metal chelate are as shown in Tables 1 to 4.

The squarylium metal chelate used in the second embodiment may be any squarylium metal chelate as long as it has the maximum absorption wavelength in the range of 500 to 650 nm. Preferably, the squarylium compound is a compound represented by the formula (III) described above in connection with the first embodiment. Specific examples of the preferred squarylium metal chelate are as shown in Tables 5 to 7.

The second formazan metal chelate used in the second embodiment may be any formazan metal chelate as long as it has the maximum absorption wavelength in the range of 650 to 750 nm. Preferably, the second formazan compound is a compound represented by one of the formulas (I) and (II) described above in connection with the first embodiment. Specific examples of the preferred second formazan metal chelate are as shown in the following Tables 13 to 14.

TABLE 13

| Second Formazan Metal Chelate No. | Second Formazan Compound | Metal Component |
|---|---|---|
| E-1 | *(structure with pyrimidinyl-NH, N=N, C, phenyl-CF₃, and phenyl-morpholinyl groups)* | Ni |
| E-2 | *(bis-formazan structure with pyridinyl-NH groups, two N=N-C linkages, two phenyl-N(CH₃)₂ groups bridged by -CH₂-)* | Ni |
| E-3 | *(structure with pyrimidinyl-NH, N=N, C, phenyl, and phenyl-morpholinyl groups)* | Ni |

TABLE 13-continued
| Second Formazan Metal Chelate No. | Second Formazan Compound | Metal Component |
|---|---|---|
| E-4 | 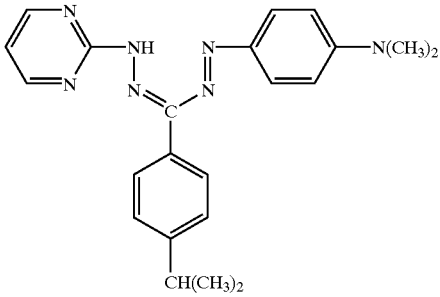 | Ni |
| E-5 | | Ni |
TABLE 14
| Second Formazan Metal Chelate No. | Second Formazan Compound | Metal Component |
|---|---|---|
| B-6 | | Ni |
| B-7 | | Ni |

TABLE 14-continued

| Second Formazan Metal Chelate No. | Second Formazan Compound | Metal Component |
|---|---|---|
| B-8 | [structure with PhO-triazine, N(CH₃)₂, NO₂ groups] | Cu |
| B-9 | [structure with (C₂H₅)₂N groups, N(CH₃)₂, thiophene] | Co |
| B-10 | [structure with pyrimidine, morpholine, thiophene] | Ni |
| B-11 | [structure with pyrimidine, N(C₂H₅)₂, HOOC, pyridine] | Ni |

By using the second formazan metal chelate, which has the maximum absorption wavelength (λmax) near the recording and reading wavelength, in conjunction and the mixture of the first formazan metal chelate with the squarylium metal chelate, the optical recording medium can show desired sensitivity while maintaining its desired optical characteristics, even when the wavelength of the laser beam varies.

It is preferred that the weight ratio of the first formazan metal chelate to the squarylium metal chelate range from 10:90 to 50:50 for reasons of high light resistance and high reflectance. For reasons of excellent optical characteristics and low dependency of the sensitivity to the wavelength, the second formazan metal chelate is preferably present in an amount of 0.5 to 20% by weight, more preferably 3 to 10% by weight, based on a total weight of the first formazan metal chelate and the squarylium metal chelate.

It is preferred that the optical recording medium of the present invention have a large absorption band over a relatively short wavelength region in a wavelength range of from 600 nm to 720 nm of the wavelength range of the recording and reading laser light. In this case, the laser light used for recording and reading information preferably has a wavelength near the longer side end of the wavelength range of from 600 nm to 720 nm (i.e., in the wavelength of the reading and reading laser light). Such an optical recording medium has large refractive index and extinction coefficient for light with the wavelength range of 600 nm to 720 nm.

In particular, the recording layer, when formed by itself into a film, preferably has a refractive index (n) in the range of 1.5 to 3.0 and an extinction coefficient (k) in the range of 0.02 to 0.3 both for a wavelength between ±5 nm from the reading and/or recording wavelength. When the refractive index (n) is 1.5 or greater, a sufficient optical change occurs, making it possible to enhance the degree of recording modulation. When the refractive index (n) is 3.0 or less, dependence of recording and reading on the wavelength decreases so that reading errors due to the light in the recording or reading wavelength region do not occur easily. Further, when the extinction coefficient (k) is 0.02 or greater, recording sensitivity can be improved. When the coefficient (k) is 0.3 or less, a reflectivity of 50% or greater can be easily obtained. In addition, for reasons of high refractive index (n), the recording layer preferably has log $\epsilon$ ($\epsilon$: molar absorbance coefficient) of at least 5.

From the viewpoint of light resistance, the optical recording layer medium preferably has reading stability even after reading has been repeated 1 million times or more and has light fastness enough to be free from fading when left indoors.

The substrate usually has a guide groove having a depth of 1000 to 2500 Å. When a great capacity is necessary, the track pitch of the guide groove is preferably 0.7 to 0.8 µm, although it is usually set at 0.7 to 1.0 µm. The groove width is, at a half bandwidth, preferably 0.18 to 0.40 µm. At the half bandwidth of 0.18 µm or greater, tracking error signals having a sufficient intensity can be attained easily. When the half bandwidth is 0.40 µm or less, spreading of a recorded portion in the width direction can be prevented. The half bandwidth within the above-described range is therefore preferred.

Description will next be made of the constitution of the optical recording medium of the present invention with reference to FIGS. 2(a) to 2(d), FIGS. 3(a) to 3(c) and FIGS. 4(a) to 4(c), in which the same reference numerals designate similar layers.

Figure 2:
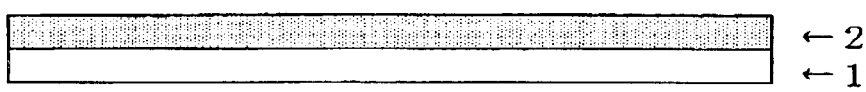
FIG. 2(a) to FIG. 2(d) are schematic cross-sectional views showing examples of the general overwritable optical recording media embodying the present invention.
Figure 2:
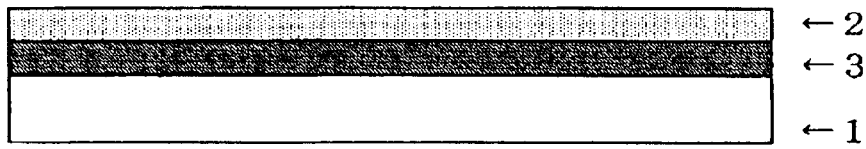
Figure 2:
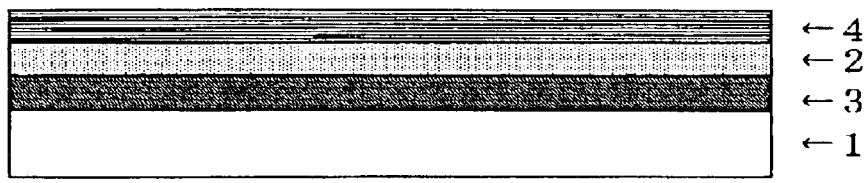
Figure 2:

FIGS. 2(a) to 2(d) show schematic cross-sectional views which show structural examples of an optical recording medium of the present invention, which can be used as a write once read many (WORM) type optical disk. The recording medium of the present invention shown in FIG. 2(a) comprises a substrate 1 and a recording layer 2 which is provided on the substrate 1. The recording medium of the present invention shown in FIG. 2(b) is the same as the recording medium shown in FIG. 2(a) except that an undercoat layer 3 is interposed between the substrate 1 and the recording layer 2. The recording medium of the present invention shown in FIG. 2(c) is the same as the recording medium shown in FIG. 2(b) except that a protective layer 4 is overlaid on the recording layer 2. The recording medium of the present invention shown in FIG. 2(d) is the same as the recording medium shown in FIG. 2(c) except that a hard coat layer 5 is provided on the back side of the substrate 1, opposite to the side of the undercoat layer 3 with respect to the substrate 1.

Figure 3A:
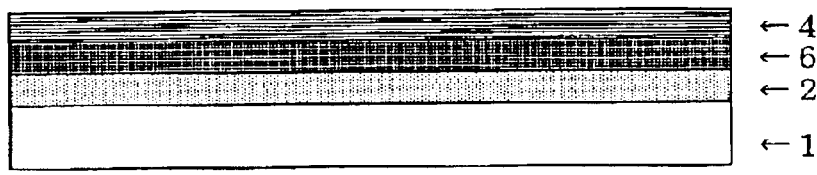
FIG. 3(a) to FIG. 3(c) are schematic cross-sectional views showing examples of CD-R media embodying the present invention.
Figure 3B:
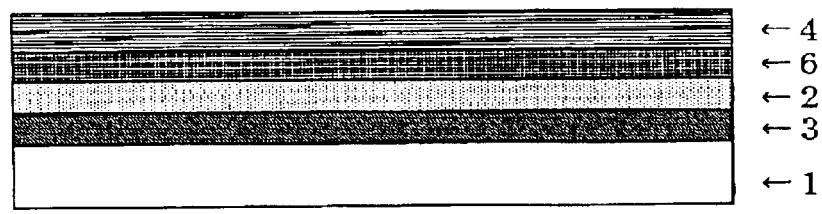
Figure 3C:
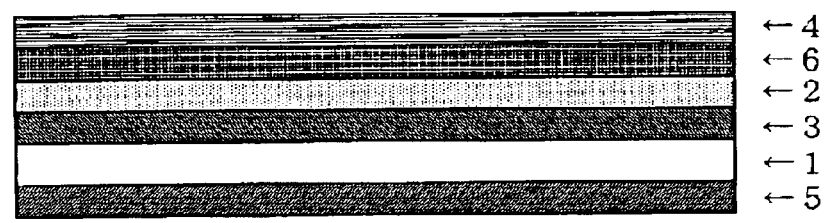

FIGS. 3(a) to 3(c) are schematic cross-sectional views showing the structure of an optical recording medium according to the present invention, which can be used as a recording medium for the CD-R. The recording medium of the present invention shown in FIG. 3(a) comprises a substrate 1, and a recording layer 2, a reflection layer 6 and a protective layer 4 which are successively overlaid on the substrate 1. The recording medium of the present invention shown in FIG. 3(b) is the same as the recording medium shown in FIG. 3(a) except that an undercoat layer 3 is interposed between the substrate 1 and the recording layer 2. The recording medium of the present invention shown in FIG. 3(c) is the same as the recording medium shown in FIG. 3(b) except that a hard coat layer 5 is provided on the back side of the substrate 1, opposite to the side of the undercoat layer 3 with respect to the substrate 1.

Figure 4A:
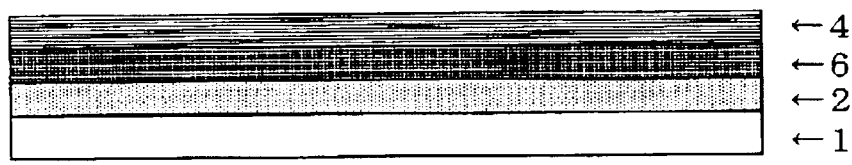
FIG. 4(a) to FIG. 4(c) are schematic cross-sectional views showing examples of DVD-R and/or DVD+R media embodying the present invention.
Figure 4B:
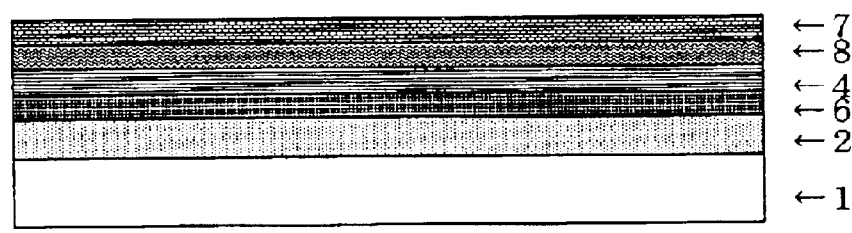
Figure 4C:
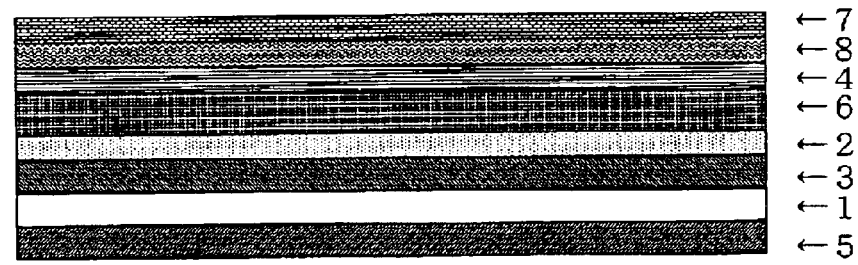

FIGS. 4(a) to 4(c) are schematic cross-sectional views showing the structure of the optical recording medium according to the present invention, which can be used as a recording medium for DVD–R and/or DVD+R. The recording medium shown in FIG. 4(a) is the same as that shown in FIG. 3(a) in terms of the structure. The recording medium shown in FIG. 4(b) is the same as the recording medium shown in FIG. 3(a) except that a protective substrate 7 is attached to the protective layer 4 with an adhesive layer 8. The recording medium shown in FIG. 4(c) is the same as the recording medium shown in FIG. 3(c) except that a protective substrate 7 is attached to the protective layer 4 with an adhesive layer 8.

An optical recording medium of the present invention can also be constructed by superimposing any two of the above-mentioned recording media in such a manner that the recording layers of the two recording media are positioned inside so as to face each other with an air gap therebetween in a sealed air-sandwich structure, or by laminating the two recording media in the above-mentioned posture, but through the protective layer.

Properties or characteristics and materials for each of the above-mentioned layers of the optical recording medium of the present invention will now be explained.

<Substrate>

When recording or reading is carried out from the direction of the substrate, the substrate needs to be transparent to the employed laser beam. Such transparency is not required when recording or reading is carried out on the recording layer. In the present invention, when two substrates are used in the sandwiched form and one of these substrates is transparent, transparency of the other substrate is unnecessary.

Examples of the material usable for the substrate include plastics such as polyester, acrylic resin, polyamide, polycarbonate resin, polyolefin resin, phenol resin, epoxy resin, and polyimide; glass; ceramics; and metals.

Guide grooves or guide pits for tracking may be formed on the surface of the substrate when the substrate is used alone, or on the surface of the first substrate when two substrates are used in the sandwiched structure. Furthermore, pre-formats for address signals may also be formed on the surface of the substrate.

<Recording Layer>

Information can be recorded in a recording layer by some optical changes in the recording layer caused by exposure to a laser beam. The recording layer is required to contain the above-described compounds. If desired, the recording layer may additionally include one or more other organic dyes or one or more metal or metal compounds for the purpose of improving the optical properties, recording sensitivity, and signal characteristics. Alternatively, the recording layer may be laminated with one or more layers containing such additional organic dye, metal or metal compound.

Examples of such additional organic dye include (poly) methine dye, naphthalocyanine dye, phthalocyanine dye, squarylium dye, croconium dye, pyrillium dye, naphthoquinone dye, anthraquinone (indanthrene) dye, xanthene dye, triphenylmethane dye, azulene dye, tetrahydrocholine dye, phenanthrene dye, and triphenothiazine dye. Examples of the metal and metal compound include In, Te, Bi, Se, Sb, Ge, Sn, Al, Be, $TeO_2$, SnO, As and Cd.

The recording layer may contain various materials, for example, polymers such as ionomer resin, polyamide resin, vinyl resin, natural polymers, silicone, and liquid rubber, and a silane coupling agent may be mixed in the dispersed form. In order to improve the properties of the recording layer, a stabilizer (for example, a transition metal complex), dispersant, flame retardant, lubricant, antistatic, surfactant and/or plasticizer can be used in combination.

The recording layer can be formed by a generally employed method such as deposition, sputtering, CVD, or solution coating. For the solution coating, the above-described compounds and other materials are dissolved in an organic solvent and the resulting solution is coated by a conventional coating method such as spray coating, roller coating, dip coating, or spin coating.

Examples of the organic solvent used for forming a recording layer include alcohols such as methanol, ethanol, isopropanol and 2,2,3,3-tetrafluoropropanol; ketones such as acetone, methyl ethyl ketone, and cyclohexanone; amides such as N,N-dimethylformamide and N,N-dimethylacetamide; sulfoxides such as dimethyl sulfoxide; ethers such as tetrahydrofuran, dioxane, diethyl ether, and ethylene glycol monomethyl ether; esters such as methyl acetate and ethyl acetate; aliphatic halogenated hydrocarbons such as chloroform, methylene chloride, dichloroethane, carbon tetrachloride, and trichloroethane; aromatic solvents such as benzene, xylene, monochlorobenzene, and dichlorobenzene; Cellosolves such as methoxy ethanol and ethoxy ethanol; and hydrocarbons such as hexane, pentane, cyclohexane, and methylcyclohexane.

The recording layer has preferably a thickness ranging from 100 Å to 10 $\mu$m, more preferably from 200 Å to 2000 Å.

<Undercoat Layer>

The undercoat layer is disposed for the purposes of: (1) improving the adhesion, (2) serving as a barrier layer against water or gases; (3) improving the shelf life of the recording layer, (4) improving the reflectivity of the recording layer, (5) protecting the substrate from solvents, and/or (6) forming guide grooves, guide pits, pre-formats, and the like.

To attain the above-mentioned purpose (1), a variety of polymer compounds such as ionomer resin, polyamide resin, vinyl resin, natural resins, natural polymers, silicone, and liquid rubber; and silane coupling agents may be employed. To attain the purposes (2) and (3), inorganic compounds such as SiO, $MgF_2$, $SiO_2$, $TiO_2$, ZnO, TiN, and SiN can be used as well as the above-described polymer materials. In addition, metals and semimetals such as Zn, Cu, Ni, Cr, Ge, Se, Au, Ag, and Al can be used. To attain the purpose (4), metals such as Al and Ag, and organic thin films having a metal luster such as methine dye and xanthene dye may be used. To attain the purposes (5) and (6), an ultraviolet-curing resin, a thermosetting resin, and a thermoplastic resin can be used.

The undercoat layer is formed to have a film thickness of preferably 0.01 to 30 $\mu$m, more preferably 0.05 to 10 $\mu$m.

<Metal Reflective Layer>

The metal reflective layer is made of a metal or semimetal exhibiting a high reflectivity even if it is used alone and corrosion resistance. Specific examples of such a metal include Au, Ag, Cr, Ni, Al, Fe, Sn, and Cu. Among these metals, Au, Ag, and Al are particularly preferred in view of the reflectivity and the productivity. These metals and semimetals may be used either alone or in combination of two as an alloy. The metal reflective layer can be formed, for example, by deposition or sputtering. The reflective layer has a thickness of preferably 50 to 5000 Å, more preferably 100 to 3000 Å.

<Protective Layer and Substrate-Surface Hard Coat Layer>

The protective layer and the substrate-surface hard coat layer are laid in order to (1) protect the recording layer (or the reflection absorbing layer) from scratches, dust, and contamination, (2) improve the shelf life of the recording layer (or the reflection absorbing layer), and (3) improve the reflectivity. To satisfy these purposes, materials similar to those used for the undercoat layer may be used. As inorganic materials, SiO and $SiO_2$ may be used. Examples of the organic material include heat softening resins, hot-melt resins and ultraviolet-curing resins such as poly(methyl acrylate), polycarbonate, epoxy resin, polystyrene, polyester resin, vinyl resin, cellulose, aliphatic hydrocarbon resin, aromatic hydrocarbon resin, natural rubber, styrene-butadiene resin, chloroprene rubber, wax, alkyd resin, drying oil, and rosin. Among these, ultraviolet-curing resins are most preferred because of excellent productivity.

The protective layer or the substrate-surface hard coat layer has a thickness of preferably 0.01 to 30 $\mu$m, more preferably 0.05 to 10 $\mu$m.

In the present invention, a stabilizer, dispersant, flame retardant, lubricant, antistatic, surfactant, and/or plasticizer may be incorporated in the undercoat layer, the protective layer, or the substrate-surface hard coat layer as in the case of the recording layer.

<Protective Substrate>

The protective substrate needs to be transparent to a laser light to which it is exposed. However, such transparency is unnecessary when the protective substrate is used only for protection. The materials for the protective substrate are utterly same as those for the substrate. For example, plastics such as polyester, acrylic resin, polyamide, polycarbonate resin, polyolefin resin, phenol resin, epoxy resin, and polyimide; glass; ceramics; and metals, and the like may be used.

<Adhesive and Adhesive Layer>

Any material can be used insofar as two recording media can be adhered thereto. From the viewpoint of the productivity, an ultraviolet-curing adhesive or hot-melt adhesive is preferred.

The following examples will further illustrate the present invention.

EXAMPLE 1

A polycarbonate substrate was prepared by injection molding. The substrate had a thickness of 0.6 mm, a diameter of 120 mm and guide grooves having a depth of 1750 Å, a half width of 0.25 $\mu$m and a track pitch of 0.74 $\mu$m. A coating liquid in which 40 parts by weight of formazan metal chelate A-9 (Table 2), 60 parts by weight of squarylium metal chelate B-4 (Table 5) and 7 parts by weight of phthalocyanine compound C-2 (Table 8) were dissolved in 2,2,3,3-tetrafluoropropanol was applied with a spinner on the substrate to form an organic dye layer having a thickness of 1000 Å. Then, a light reflective gold layer having a thickness of 1300 Å was formed on the dye layer by a sputtering method, on which a protective layer of an acrylic photopolymer having a thickness of 5 $\mu$m was further formed. Finally, a polycarbonate substrate prepared by injection molding and having a thickness of 0.6 mm was bonded to the protective layer with an acrylic photopolymer, thereby obtaining a recording medium.

EXAMPLES 2–10

Using various combinations of a formazan metal chelate, a squarylium metal chelate and a phthalocyanine compound as shown in Table 15, optical recording media were prepared in the same manner as that in Example 1.

COMPARATIVE EXAMPLE 1

An optical recording medium was prepared in the same manner as that in Example 1 except that the recording layer did not contain the phthalocyanine compound as shown in Table 15.

TABLE 15

| Example | Formazan Metal Chelate (parts by weight) | Squarylium Metal Chelate (parts by weight) | Phthalocyanine Compound (parts by weight) |
|---|---|---|---|
| 1 | A-9 (40) | B-4 (60) | C-2 (7) |
| 2 | A-5 (25) | B-13 (75) | C-6 (3) |
| 3 | A-16 (10) | B-5 (90) | C-10 (8) |
| 4 | A-13 (50) | B-18 (50) | C-4 (1) |
| 5 | A-3 (45) | B-7 (55) | C-3 (10) |
| 6 | A-11 (40) | B-8 (60) | C-11 (20) |
| 7 | A-1 (30) | B-12 (70) | C-9 (1.5) |
| 8 | A-6 (25) | B-15 (75) | C-7 (5) |
| 9 | A-4 (25) | B-1 (75) | C-12 (0.5) |
| 10 | A-15 (40) | B-17 (60) | C-1 (15) |
| Comp. 1 | A-9 (40) | B-4 (60) | — |

On each of the thus obtained recording media was performed the recording using a semiconductor laser beam having an oscillation wavelength of 658 nm and a beam diameter of 1.0 μm. The recording was performed at a recording linear velocity of 3.5 m/sec. The record was read with a continuous semiconductor laser beam of 658 nm (reading power: 0.7 mW) to observe the reading wave form. Similar recording and reading were carried out using a semiconductor laser beam having a wavelength of 670 nm. The results are shown in Table 16.

TABLE 16

| | 658 nm | | 670 nm | |
|---|---|---|---|---|
| Example | Reflectance (%) | Recording Sensitivity (mW) | Reflectance (%) | Recording Sensitivity (mW) |
| 1 | 48 | 7.8 | 49 | 8.1 |
| 2 | 50 | 7.8 | 53 | 8.3 |
| 3 | 48 | 7.5 | 49 | 7.8 |
| 4 | 50 | 8.0 | 52 | 8.5 |
| 5 | 48 | 7.7 | 49 | 8.1 |
| 6 | 46 | 7.7 | 46 | 7.6 |
| 7 | 50 | 8.1 | 52 | 8.6 |
| 8 | 49 | 7.8 | 49 | 8.2 |
| 9 | 52 | 8.0 | 54 | 8.9 |
| 10 | 49 | 7.7 | 48 | 8.0 |
| Comp. 1 | 51 | 8.0 | 53 | 15.0 |

EXAMPLE 11

A polycarbonate substrate was prepared by injection molding. The substrate had a thickness of 0.6 mm, a diameter of 120 mm and guide grooves having a depth of 1750 Å, a half width of 0.25 μm and a track pitch of 0.74 μm. A coating liquid in which 40 parts by weight of formazan metal chelate A-9 (Table 2), 60 parts by weight of squarylium metal chelate B-4 (Table 5) and 3 parts by weight of pentamethine cyanine compound D-10 (Table 11) were dissolved in 2,2,3,3-tetrafluoropropanol was applied with a spinner on the substrate to form an organic dye layer having a thickness of 1000 Å. Then, a light reflective gold layer having a thickness of 1300 Å was formed on the dye layer by a sputtering method, on which a protective layer of an acrylic photopolymer having a thickness of 5 μm was further formed. Finally, a polycarbonate substrate prepared by injection molding and having a thickness of 0.6 mm was bonded to the protective layer with an acrylic photopolymer, thereby obtaining a recording medium.

EXAMPLES 12–20

Using various combinations of a formazan metal chelate, a squarylium metal chelate and a pentamethine cyanine compound as shown in Table 17, optical recording media were prepared in the same manner as that in Example 11.

COMPARATIVE EXAMPLE 2

An optical recording medium was prepared in the same manner as that in Example 11 except that the recording layer did not contain the pentamethine cyanine compound as shown in Table 17.

TABLE 17

| Example | Formazan Metal Chelate (parts by weight) | Squarylium Metal Chelate (parts by weight) | Pentamethine cyanine Compound (parts by weight) |
|---|---|---|---|
| 11 | A-9 (40) | B-4 (60) | D-10 (3) |
| 12 | A-5 (25) | B-13 (75) | D-3 (1.5) |
| 13 | A-16 (10) | B-5 (90) | D-12 (5) |
| 14 | A-13 (50) | B-18 (50) | D-2 (1.3) |
| 15 | A-3 (45) | B-7 (55) | D-5 (1.2) |
| 16 | A-11 (40) | B-8 (60) | D-1 (4) |
| 17 | A-1 (30) | B-12 (70) | D-13 (2.3) |
| 18 | A-6 (25) | B-15 (75) | D-7 (3) |
| 19 | A-4 (25) | B-1 (75) | D-2 (1.7) |
| 20 | A-15 (40) | B-17 (60) | D-14 (0.5) |
| Comp. 2 | A-9 (40) | B-4 (60) | — |

On each of the thus obtained recording media was performed the recording using a semiconductor laser beam having an oscillation wavelength of 658 nm and a beam diameter of 1.0 μm. The recording was performed at a recording linear velocity of 3.5 m/sec. The record was read with a continuous semiconductor laser beam of 658 nm (reading power: 0.7 mW) to observe the reading wave form. Similar recording and reading were carried out using a semiconductor laser beam having a wavelength of 670 nm. The results are shown in Table 18.

TABLE 18

| | 658 nm | | 670 nm | |
|---|---|---|---|---|
| Example | Reflectance (%) | Recording Sensitivity (mW) | Reflectance (%) | Recording Sensitivity (mW) |
| 11 | 48 | 7.8 | 50 | 8.1 |
| 12 | 50 | 7.4 | 52 | 7.9 |
| 13 | 47 | 7.3 | 47 | 7.2 |
| 14 | 50 | 8.0 | 50 | 8.3 |
| 15 | 49 | 7.9 | 51 | 8.3 |
| 16 | 46 | 7.7 | 46 | 7.7 |
| 17 | 48 | 7.7 | 49 | 7.8 |
| 18 | 49 | 7.6 | 49 | 7.8 |
| 19 | 51 | 8.0 | 53 | 8.3 |
| 20 | 52 | 8.1 | 53 | 8.7 |
| Comp. 2 | 51 | 8.0 | 53 | 15.0 |

EXAMPLE 21

A polycarbonate substrate was prepared by injection molding. The substrate had a thickness of 0.6 mm, a diameter of 120 mm and guide grooves having a depth of 1750 Å, a half width of 0.25 μm and a track pitch of 0.74 μm. A coating liquid in which 40 parts by weight of first formazan metal chelate A-9 (Table 2), 60 parts by weight of squarylium metal chelate B-4 (Table 5) and 5 parts by weight of second formazan metal chelate E-3 (Table 13) were dissolved in 2,2,3,3-tetrafluoropropanol was applied with a spinner on the substrate to form an organic dye layer having a thickness of 1000 Å. Then, a light reflective gold layer having a thickness of 1300 Å was formed on the dye layer by a sputtering method, on which a protective layer of an acrylic photopolymer having a thickness of 5 μm was further formed. Finally, a polycarbonate substrate prepared by injection molding and having a thickness of 0.6 mm was bonded to the protective layer with an acrylic photopolymer, thereby obtaining a recording medium.

EXAMPLES 22–30

Using various combinations of a first formazan metal chelate, a squarylium metal chelate and a second formazan compound as shown in Table 19, optical recording media were prepared in the same manner as that in Example 21.

COMPARATIVE EXAMPLE 3

An optical recording medium was prepared in the same manner as that in Example 21 except that the recording layer did not contain the second formazan metal chelate as shown in Table 19.

TABLE 19

| Example | First Formazan Metal Chelate (parts by weight) | Squarylium Metal Chelate (parts by weight) | Second Formazan Metal Chelate (parts by weight) |
| --- | --- | --- | --- |
| 21 | A-9 (40) | B-4 (60) | E-3 (5) |
| 22 | A-5 (25) | B-13 (75) | E-7 (8) |
| 23 | A-6 (10) | B-5 (90) | E-11 (20) |
| 24 | A-3 (50) | B-18 (50) | E-4 (5) |
| 25 | A-3 (45) | B-7 (55) | E-8 (10) |
| 26 | A-1 (40) | B-8 (60) | E-2 (0.5) |
| 27 | A-1 (30) | B-12 (70) | E-6 (1.2) |
| 28 | A-6 (25) | B-15 (75) | E-10 (5) |
| 29 | A-4 (25) | B-1 (75) | E-1 (15) |
| 30 | A-5 (40) | B-17 (60) | E-9 (3) |
| Comp. 3 | A-9 (40) | B-4 (60) | — |

On each of the thus obtained recording media was performed the recording using a semiconductor laser beam having an oscillation wavelength of 658 nm and a beam diameter of 1.0 μm. The recording was performed at a recording linear velocity of 3.5 m/sec. The record was read with a continuous semiconductor laser beam of 658 nm (reading power: 0.7 mW) to observe the reading wave form. Similar recording and reading were carried out using a semiconductor laser beam having a wavelength of 670 nm. The results are shown in Table 20.

TABLE 20

| | 658 nm | | 670 nm | |
| --- | --- | --- | --- | --- |
| Example | Reflectance (%) | Recording Sensitivity (mW) | Reflectance (%) | Recording Sensitivity (mW) |
| 21 | 48 | 7.7 | 49 | 8.3 |
| 22 | 51 | 7.6 | 53 | 8.1 |
| 23 | 47 | 7.5 | 46 | 7.5 |
| 24 | 50 | 8.1 | 51 | 8.6 |
| 25 | 48 | 7.7 | 49 | 7.9 |
| 26 | 51 | 7.9 | 53 | 8.5 |
| 27 | 50 | 8.1 | 52 | 8.6 |
| 28 | 49 | 7.6 | 50 | 8.0 |
| 29 | 47 | 8.1 | 47 | 8.3 |
| 30 | 49 | 7.7 | 48 | 8.1 |
| Comp. 3 | 51 | 8.0 | 53 | 15.0 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims and therefore intended to be embraced therein.

The teachings of Japanese Patent Applications No. 2002-034725, filed Feb. 12, 2002; No. 2002-142718, filed May 17, 2002; No. 2002-143691, filed May 17, 2002; and No. 2002-148122, filed May 22, 2002, inclusive of the specification, claims and drawings, are hereby incorporated by reference herein.

What is claimed is:

1. An optical recording medium comprising a substrate, and a recording layer provided on said substrate wherein said recording layer comprises:

(a) a formazan metal chelate which comprises a formazan compound and a metal component, (b) a squarylium metal chelate which comprises a squarylium compound and a metal component; and (c) at least one additional dye selected from the group consisting of a phthalocyanine compound and a pentamethine cyanine compound.

2. The optical recording medium as claimed in claim 1, wherein said formazan metal chelate in the form of a film has the maximum absorption wavelength in the range of 500 to 650 nm, said squarylium metal chelate in the form of a film has the maximum absorption wavelength in the range of 500 to 650 nm, and said additional dye in the form of a film has the maximum absorption wavelength in the range of 650 to 750 nm.

3. The optical recording medium as claimed in claim 1, wherein the weight ratio of said formazan metal chelate to said squarylium metal chelate ranges from 10:90 to 50:50, wherein said additional dye is a phthalocyanine compound, and wherein said phthalocyanine compound is present in an amount of 0.5 to 20% by weight based on a total weight of said formazan metal chelate and said squarylium metal chelate.

4. The optical recording medium as claimed in claim 1, wherein the weight ratio of said formazan metal chelate to said squarylium metal chelate ranges from 10:90 to 50:50, wherein said additional dye is a pentamethine cyanine compound, and wherein said pentamethine cyanine compound is present in an amount of 0.5 to 5% by weight based on a total weight of said formazan metal chelate and said squarylium metal chelate.

5. The optical recording medium as claimed in claim 1, wherein said formazan compound is represented by one of the following formulas (I) and (II):

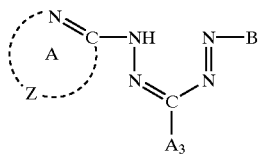

(I)

wherein Z represents a residue forming, together with the carbon atom and the nitrogen atom to which said residue is bonded, a 5-membered or 6-membered nitrogen-containing heterocyclic ring A which may have one or more substituents and which may be condensed with another ring; $A_3$ represents an alkyl group which may have one or more substituents, an aryl group which may have one or more substituents, an alkylcarbonyl group which may have one or more substituents, an arylcarbonyl group which may have one or more substituents, an alkenyl group which may have one or more substituents, a heterocyclic group which may have one or more substituents, or an alkoxycarbonyl group which may have one or more substituents; and B represents an alkyl group which may have one or more substituents, an alkenyl group which may have one or more substituents or an aryl group which may have one or more substituents,

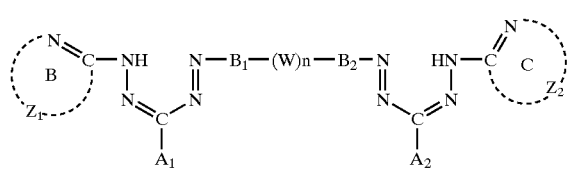

(II)

wherein $Z_1$ represents a residue forming, together with the carbon atom and the nitrogen atom to which said residue is bonded, a 5-membered or 6-membered nitrogen-containing heterocyclic ring B which may have one or more substituents and which may be condensed with another ring; $Z_2$ represents a residue forming, together with the carbon atom and the nitrogen atom to which said residue is bonded, a 5-membered or 6-membered nitrogen-containing heterocyclic ring C which may have one or more substituents and which may be condensed with another ring; $A_1$ and $A_2$ each independently represent an alkyl group which may have one or more substituents, an aryl group which may have one or more substituents, an alkylcarbonyl group which may have one or more substituents, an arylcarbonyl group which may have one or more substituents, an alkenyl group which may have one or more substituents, a heterocyclic group which may have one or more substituents, or an alkoxycarbonyl group which may have one or more substituents; $B_1$ and $B_2$ each independently represent an alkylene group which may have one or more substituents, an alkenylene group which may have one or more substituents or an arylene group which may have one or more substituents; W represents —$CH_2$— or —$SO_2$—; and n is an integer of 0 or 1.

6. The optical recording medium as claimed in claim 1, wherein the metal component of said formazan metal chelate is at least one member selected from the group consisting of vanadium, manganese, iron, cobalt, nickel, copper, zinc, palladium, oxides thereof and halides thereof.

7. The optical recording medium as claimed in claim 1, wherein said squarylium metal chelate is represented by the following formula (III):

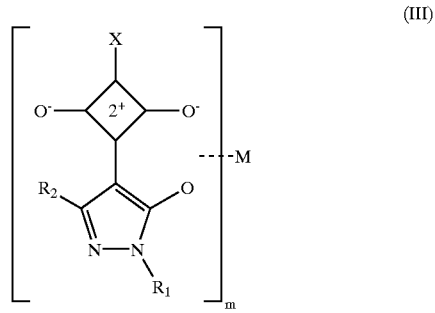

(III)

wherein $R_1$ and $R_2$ each independently represent a hydrogen atom, an aliphatic group which may have one or more substituents, an aralkyl group which may have one or more substituents, an aryl group which may have one or more substituents or a heterocyclic group which may have one or more substituents; M represents a metal atom having a coordination capacity; X represents an aryl group which may have one or more substituents, a heterocyclic group which may have one or more substituents, or $Z_3$=CH— ($Z_3$ representing a heterocyclic group which may have one or more substituents); and m is an integer of 2 or 3.

8. The optical recording medium as claimed in claim 7, wherein X in the formula (III) is represented by the following formula (IV):

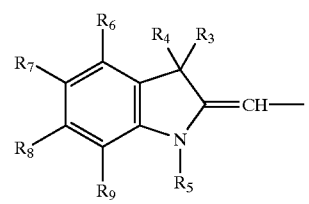

(IV)

wherein $R_3$ and $R_4$ each independently represent an aliphatic group which may have one or more substituents, or $R_3$ and $R_4$ may be taken together with an adjacent carbon atom to form a hydrocarbon ring or a heterocyclic ring; $R_5$ represents a hydrogen atom, an aliphatic group which may have one or more substituents, an aralkyl group which may have one or more substituents, or an aryl group which may have one or more substituents; $R_6$ through $R_9$ each independently represent a halogen atom, an aliphatic group which may have one or more substituents, an aralkyl group which may have one or more substituents, an aryl group which may have one or more substituents, a nitro group, a cyano group, or an alkoxy group which may have one or more substituents, or adjacent two of $R_6$ through $R_9$ may be taken together with two adjacent carbon atoms to form a ring which may have one or more substituents.

9. The optical recording medium as claimed in claim 7, wherein M in the formula (III) is aluminum.

10. The optical recording medium as claimed in claim 1, wherein said phthalocyanine compound is represented by the following formula (V):

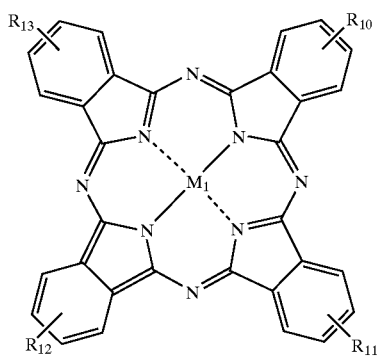

(V)

wherein $R_{10}$ through $R_{13}$ each independently represent an alkylsulfinyl group which may have one or more substituents, an alkenylsulfinyl group which may have one or more substituents, an arylsulfinyl group which may have one or more substituents, an alkylsulfonyl group which may have one or more substituents, an alkenylsulfonyl group which may have one or more substituents, an arylsulfonyl group which may have one or more substituents, an alkyloxysulfonyl group which may have one or more substituents, an alkenyloxysulfonyl group which may have one or more substituents, an aryloxysulfonyl group which may have one or more substituents, an alkoxy group which may have one or more substituents, an arylcarbonyloxy group which may have one or more substituents or a pyrazolyl group which may have one or more substituents, and $M_1$ represents a metal component or two hydrogen atoms.

11. The optical recording medium as claimed in claim 10, wherein $M_1$ in the formula (V) represents V=O or $Q_1$-Si-$Q_2$ where $Q_1$ and $Q_2$ each independently represent an alkoxy group which may have one or more substituents, an aryloxy group which may have one or more substituents, an alkoxycarbonyl group which may have one or more substituents, an aryloxycarbonyl group which may have one or more substituents, an aryloxysulfonyl group which may have one or more substituents or an arylcarbonyloxy group which may have one or more substituents.

12. The optical recording medium as claimed in claim 1, wherein said pentamethine cyanine compound is represented by the following formula (VI):

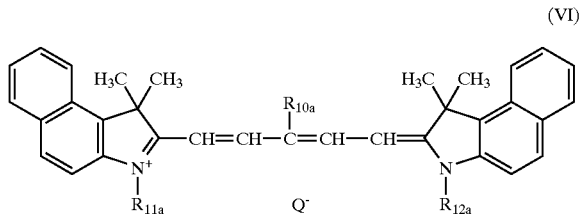

(VI)

wherein $R_{10a}$ represents a hydrogen atom, an aliphatic group which may have one or more substituents or a halogen atom, $R_{11a}$ and $R_{12a}$ each independently represent an aliphatic group which may have one or more substituents and $Q^-$ represents $I^-$, $ClO_4^-$, $BF_4^-$, $PF_6^-$, $SbF_6^-$ or $TsO^-$.

13. The optical recording medium as claimed in claim 1, wherein the refractive index (n) and the extinction coefficient (k) of a single layer of the recording layer to a light having a wavelength in the range of between (recording or reading wavelength+5 nm) and (recording or reading wavelength−5 nm) meet the following conditions:

$1.5 \leq n \leq 3.0$ and $0.02 \leq k \leq 0.3$.

14. The optical recording medium as claimed in claim 1, further comprising a reflective layer, provided over said recording layer and including a metal selected from the group consisting of gold, silver, copper, aluminum and alloys thereof.

15. The optical recording medium as claimed in claim 1, wherein said substrate has a track pitch of 0.64–0.8 μm and a groove width of 0.18–0.40 μm in terms of half width.

16. The optical recording medium as claimed in claim 1, being recordable at a wavelength of 600 to 720 nm.

17. An optical recording method comprising the step of exposing the optical recording medium according to claim 1 to a light beam having a wavelength of 600 to 720 nm.

18. An optical recording device comprising the optical recording medium according to claim 1.

19. An optical recording medium comprising a substrate, and a recording layer provided on said substrate wherein said recording layer comprises:

(a) a first formazan metal chelate which comprises a first formazan compound and a first metal component and which is in the form of a film has the maximum absorption wavelength in the range of 500 to 650 nm, (b) a squarylium metal chelate which comprises a squarylium compound and a metal component and which in the form of a film has the maximum absorption wavelength in the range of 500 to 650 nm; and (c) a second formazan metal chelate which comprises a second formazan compound and a second metal component and which in the form of a film has the maximum absorption wavelength in the range of 650 to 750 nm.

20. The optical recording medium as claimed in claim 19, wherein the weight ratio of said first formazan metal chelate to said squarylium metal chelate ranges from 10:90 to 50:50, wherein said second formazan metal chelate is present in an amount of 0.5 to 20% by weight based on a total weight of said first formazan metal chelate and said squarylium metal chelate.

21. The optical recording medium as claimed in claim 19, wherein each of said first and second formazan compounds is represented by one of the following formulas (I) and (II):

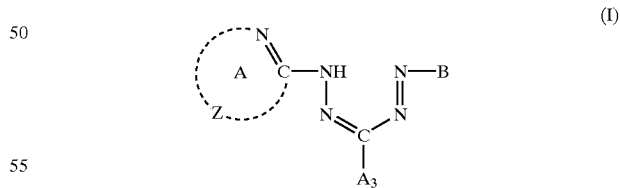

(I)

wherein Z represents a residue forming, together with the carbon atom and the nitrogen atom to which said residue is bonded, a 5-membered or 6-membered nitrogen-containing heterocyclic ring A which may have one or more substituents and which may be condensed with another ring; $A_3$ represents an alkyl group which may have one or more substituents, an aryl group which may have one or more substituents, an alkylcarbonyl group which may have one or more substituents, an arylcarbonyl group which may have one or more substituents, an alkenyl group which may have one or more substituents, a heterocyclic group which may have one or more substituents, or an alkoxycarbonyl group which may have one or more substituents; and B represents an alkyl group which may have one or more substituents, an alkenyl group which may have one or more substituents or an aryl group which may have one or more substituents,

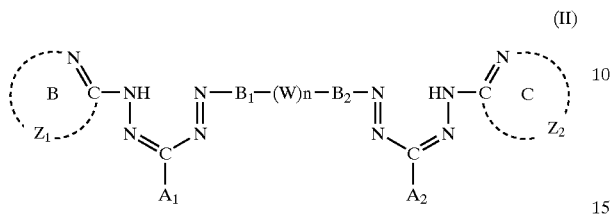

(II)

wherein $Z_1$ represents a residue forming, together with the carbon atom and the nitrogen atom to which said residue is bonded, a 5-membered or 6-membered nitrogen-containing heterocyclic ring B which may have one or more substituents and which may be condensed with another ring; $Z_2$ represents a residue forming, together with the carbon atom and the nitrogen atom to which said residue is bonded, a 5-membered or 6-membered nitrogen-containing heterocyclic ring C which may have one or more substituents and which may be condensed with another ring; $A_1$ and $A_2$ each independently represent an alkyl group which may have one or more substituents, an aryl group which may have one or more substituents, an alkylcarbonyl group which may have one or more substituents, an arylcarbonyl group which may have one or more substituents, an alkenyl group which may have one or more substituents, a heterocyclic group which may have one or more substituents, or an alkoxycarbonyl group which may have one or more substituents; $B_1$ and $B_2$ each independently represent an alkylene group which may have one or more substituents, an alkenylene group which may have one or more substituents or an arylene group which may have one or more substituents; W represents —$CH_2$— or —$SO_2$—; and n is an integer of 0 or 1.

22. The optical recording medium as claimed in claim 19, wherein the metal component of said first and second formazan metal chelate is at least one member selected from the group consisting of vanadium, manganese, iron, cobalt, nickel, copper, zinc, palladium, oxides thereof and halides thereof.

23. The optical recording medium as claimed in claim 19, wherein said squarylium metal chelate is represented by the following formula (III):

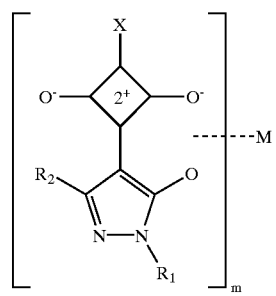

(III)

wherein $R_1$ and $R_2$ each independently represent a hydrogen atom, an aliphatic group which may have one or more substituents, an aralkyl group which may have one or more substituents, an aryl group which may have one or more substituents or a heterocyclic group which may have one or more substituents; M represents a metal atom having a coordination capacity; X represents an aryl group which may have one or more substituents, a heterocyclic group which may have one or more substituents, or $Z_3$=CH— ($Z_3$ representing a heterocyclic group which may have one or more substituents); and m is an integer of 2 or 3.

24. The optical recording medium as claimed in claim 23, wherein X in the formula (III) is represented by the following formula (IV):

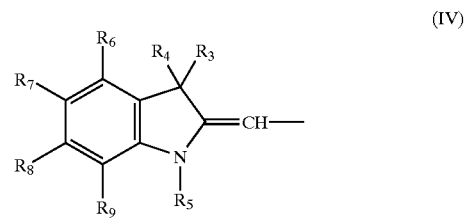

(IV)

wherein $R_3$ and $R_4$ each independently represent an aliphatic group which may have one or more substituents, or $R_3$ and $R_4$ may be taken together with an adjacent carbon atom to form a hydrocarbon ring or a heterocyclic ring; $R_5$ represents a hydrogen atom, an aliphatic group which may have one or more substituents, an aralkyl group which may have one or more substituents, or an aryl group which may have one or more substituents; $R_6$ through $R_9$ each independently represent a halogen atom, an aliphatic group which may have one or more substituents, an aralkyl group which may have one or more substituents, an aryl group which may have one or more substituents, a nitro group, a cyano group, or an alkoxy group which may have one or more substituents, or adjacent two of $R_6$ through $R_9$ form a ring may be taken together with two adjacent carbon atoms to form a ring which may have one or more substituents.

25. The optical recording medium as claimed in claim 23, wherein M in the formula (III) is aluminum.

26. The optical recording medium as claimed in claim 24, wherein M in the formula (III) is aluminum.

27. The optical recording medium as claimed in claim 19, wherein the refractive index (n) and the extinction coefficient (k) of a single layer of the recording layer to a light having a wavelength in the range of between (recording or reading wavelength+5 nm) and (recording or reading wavelength−5 nm) meet the following conditions:

$1.5 \leq n \leq 3.0$ and
$0.02 \leq k \leq 0.3$.

28. The optical recording medium as claimed in claim 19, further comprising a reflective layer, provided over said recording layer and including a metal selected from the group consisting of gold, silver, copper, aluminum and alloys thereof.

29. The optical recording medium as claimed in claim 19, wherein said substrate has a track pitch of 0.64–0.8 μm and a groove width of 0.18–0.40 μm in terms of half width.

30. An optical recording medium as claimed in claim 19, and being recordable at a wavelength of 600 to 720 nm.

31. An optical recording method comprising the step of exposing the optical recording medium according to claim 19 to a light beam having a wavelength of 600 to 720 nm.

32. An optical recording device comprising the optical recording medium according to claim 19.

33. An optical recording medium comprising a substrate, and a recording layer provided on said substrate wherein said recording layer comprises:

(a) a first formazan metal chelate which comprises a first formazan compound and a first metal component and which in the form of a film has the maximum absorption wavelength in the range of 500 to 650 nm, (b) a squarylium metal chelate which comprises a squarylium compound and a metal component and which in the form of a film has the maximum absorption wavelength in the range of 500 to 650 nm; and (c) at least one additional dye which in the form of a film has the maximum absorption wavelength greater than 650 nm but not greater than 750 nm and which is selected from the group consisting of a phthalocyanine compound, a pentamethine cyanine compound and a second formazan metal chelate which comprises a second formazan compound and a second metal component.

* * * * *